United States Patent Office 3,091,980
Patented June 4, 1963

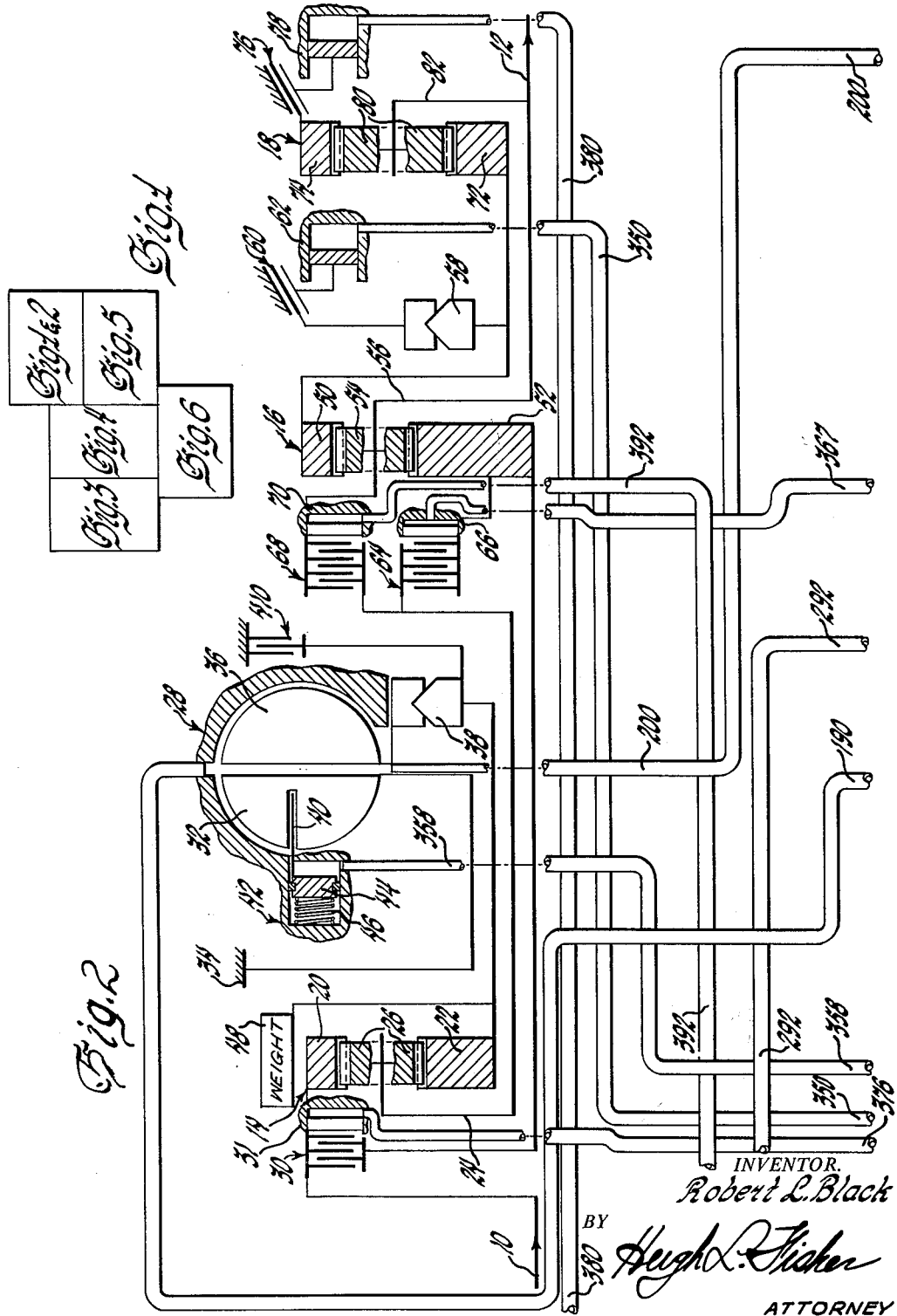

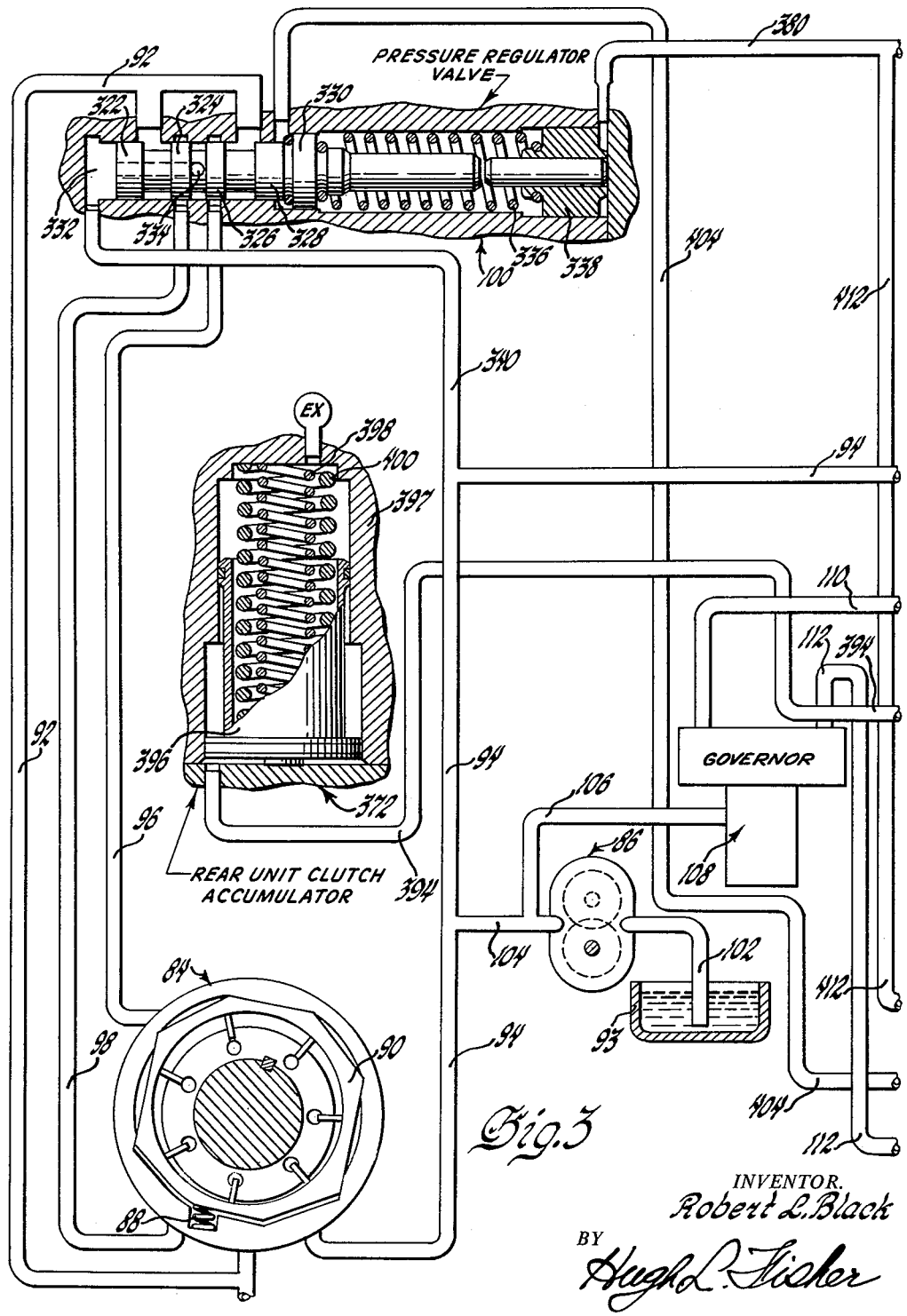

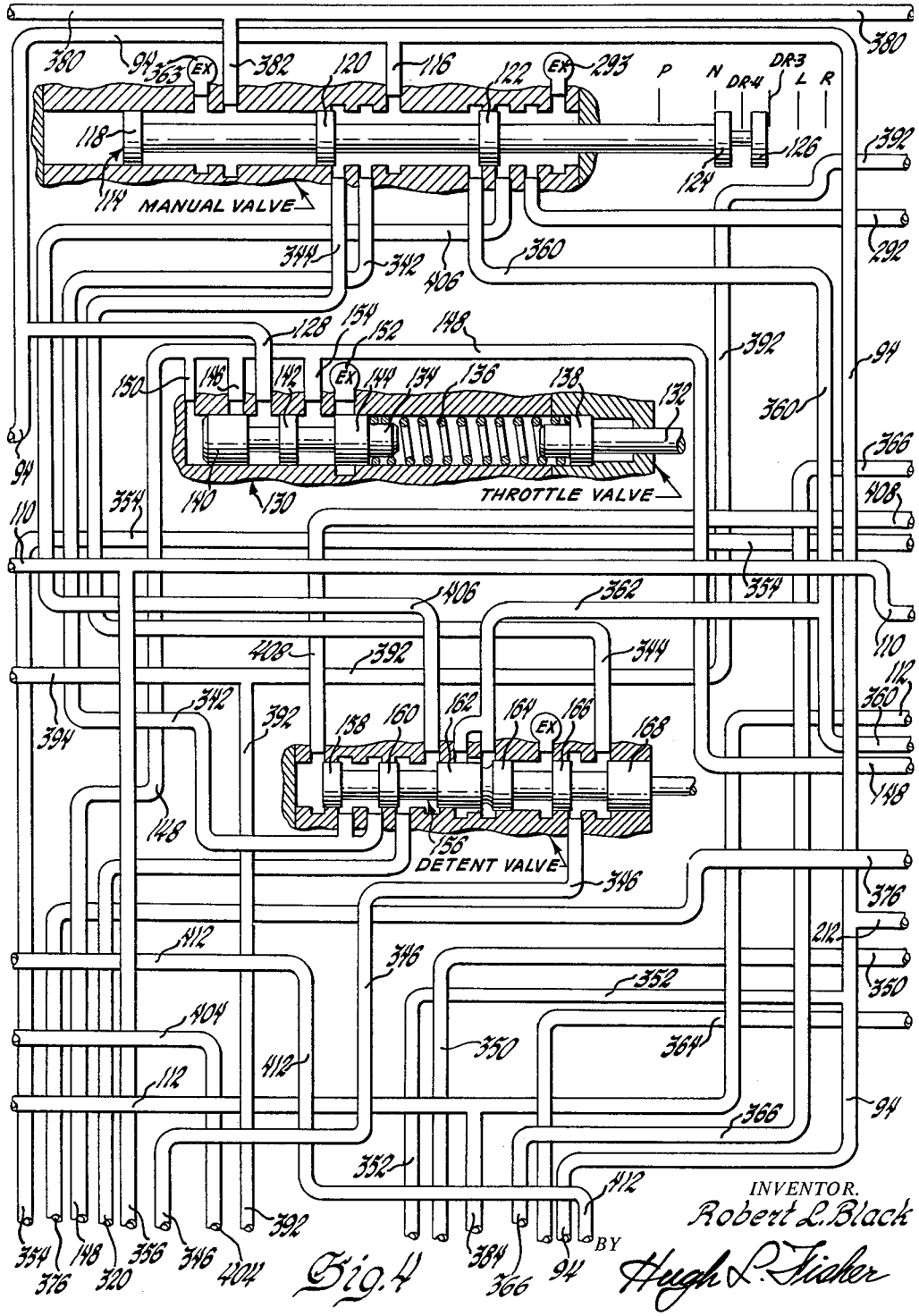

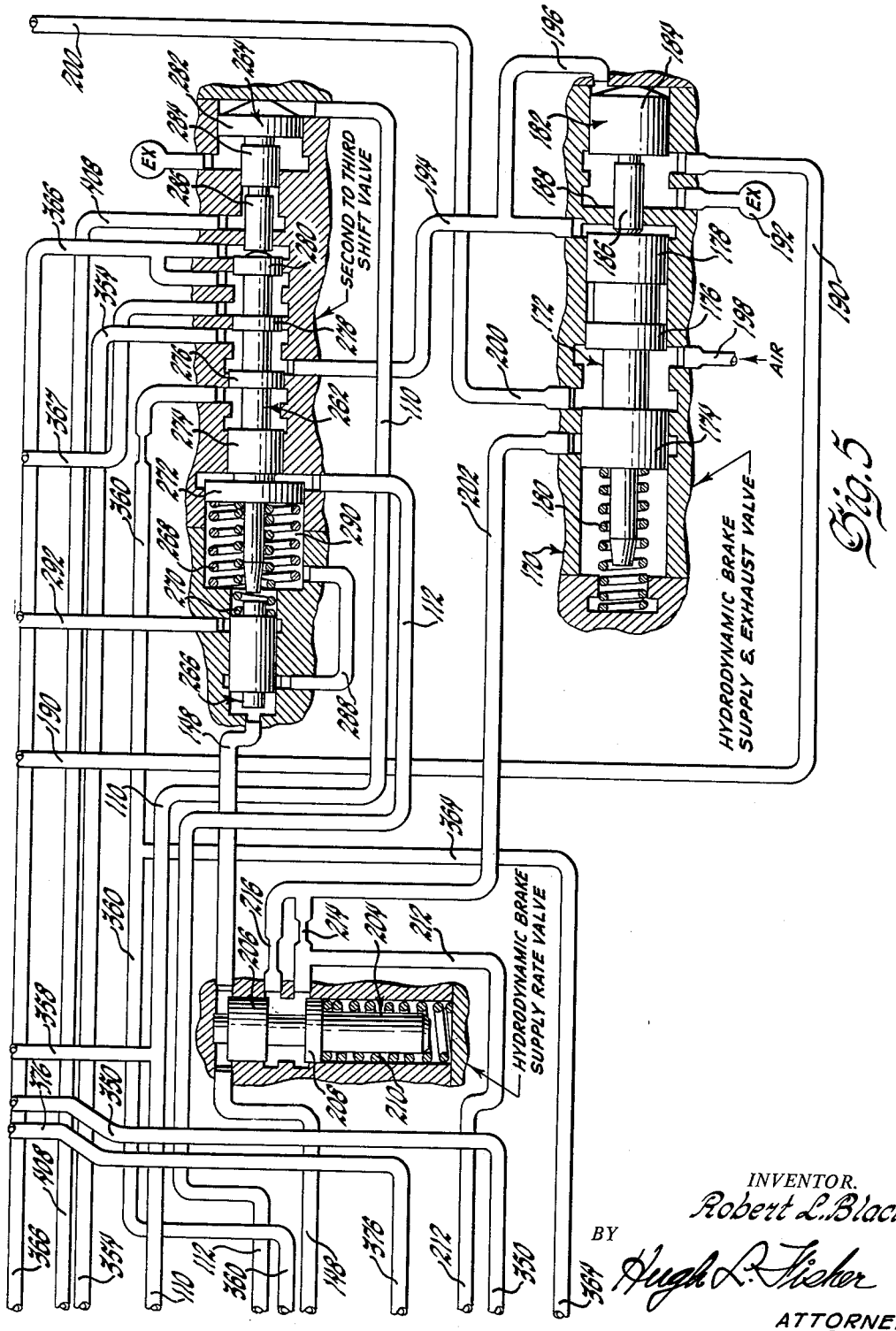

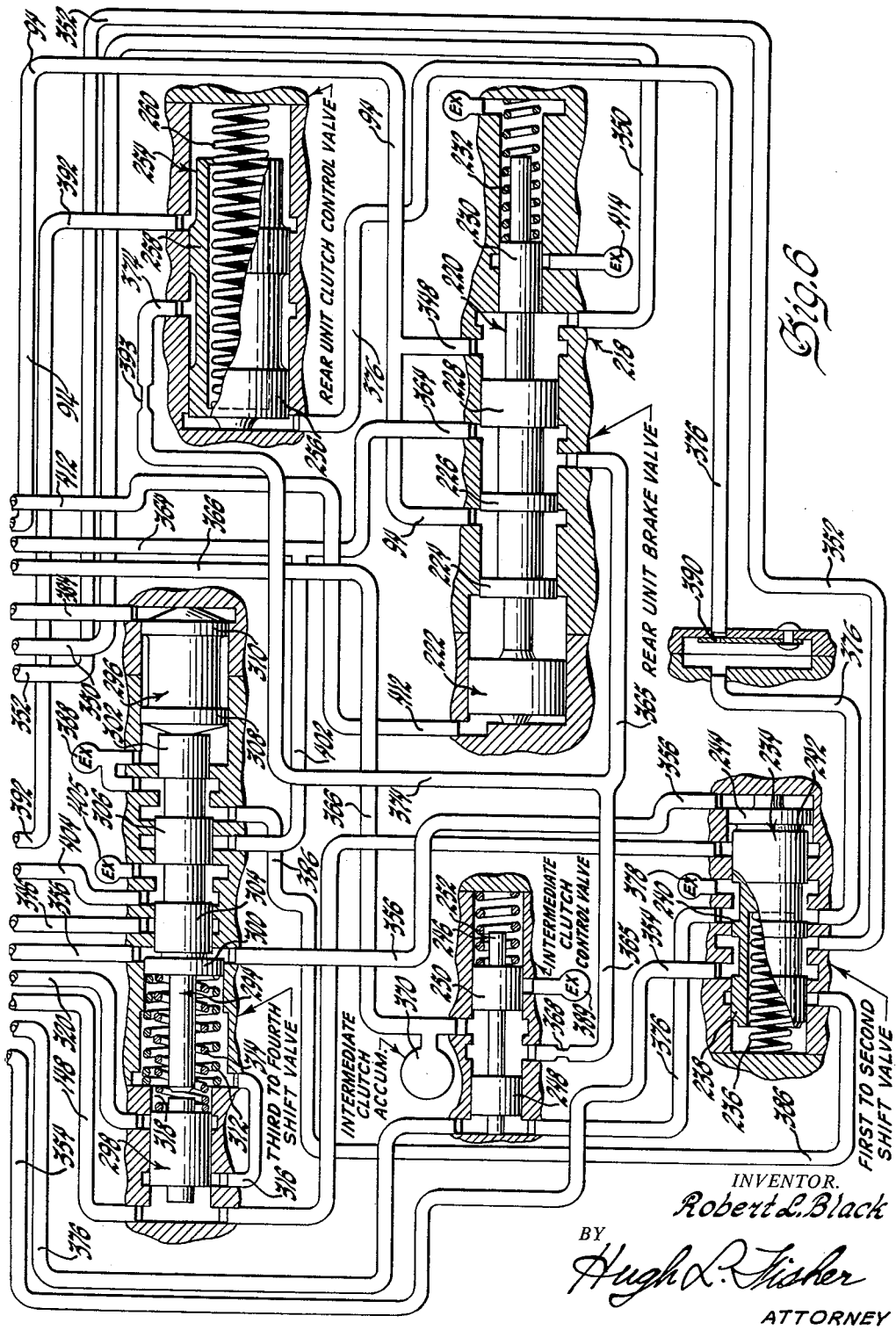

3,091,980
TRANSMISSION
Robert L. Black, Allen Park, Mich., assignor to General Motors Corporation, Detroit, Mich., a corporation of Delaware
Filed Nov. 25, 1958, Ser. No. 776,303
37 Claims. (Cl. 74—752)

This invention relates, generally, to transmissions, and particularly, to the plural step ratio automatic type adapted for use, although not exclusively, with motor vehicles.

Whenever multiple planetary gear units are combined to obtain several different and distinct drive ratios, coordinating the operation of the multiple units presents a problem. For example, assume that a transmission has two gear units constructed and arranged to provide four forward drive ratios. Customarily, then, in the first speed ratio, which is intended for low speed high torque operation, both units are conditioned, usually by brakes of some form, for reduced speed drive. In second, one of the units is locked up for a direct drive by a clutch or the equivalent and only the reduced drive from the other unit determines the second speed ratio. Now, when a transition is made from second to third speed, both gear units must necessarily be completely changed if the fourth speed is to be a direct drive. This second to third speed shift, commonly known as a "double transition shift," requires that the status of the unit, set for reduced speed drive in second speed, be changed to that needed for a direct drive and the unit conditioned for a direct drive be converted back to a reduced drive. After this double transition, the transmission may easily be changed to fourth speed since only the reduced speed drive unit must be changed to a direct drive unit. Obviously, then, the critical shift or change in drive ratio is a second to third speed double transition shift, which is very difficult to calibrate for all conditions, and so requires a considerable number of relatively complicated controls to insure a proper and smooth change. For it is possible, instead of shifting to third speed, with faulty shift calibration, to downshift back to first speed or overshift to fourth speed simply by causing one unit to become operative or inoperative in improper sequence.

To overcome this problem, the invention contemplates the provision of a plural step ratio transmission in which multiple planetary gear units are uniquely arranged so as to permit completion of a portion of a double transition ratio change, i.e., a change requiring the reconditioning of at least two gear units, before the ratio change so that at the time of the ratio change only a minimum number of operations are necessary. By this arrangement, the ratio change takes place smoothly and without the need for any complicated control system.

More specifically, the invention combines two planetary gear units and operates them by clutches and brakes so that, before the double transition shift, one gear unit is completely conditioned for the next drive ratio without altering or influencing the drive ratio in effect at that time. At the instant of the ratio change, only one ratio changing device for the other gear unit is operated and is of such a character that a smooth transition is easily attainable. Also, the invention incorporates an inertia balancing arrangement into the transmission so as to enhance the shifting ability.

It is another objective of the invention to provide a control system for the foregoing transmission relatively uncomplicated and simple in operation so as to coordinate the various operative steps for completing the ratio changes efficiently and smoothly.

Still another purpose of the invention is to afford a novel array of the transmission elements so that in changing the status of the transmission from a neutral no-drive condition to a drive condition, a clutch is engaged rather than a brake, the engagement of the clutch under these conditions being inherently gentler.

Any transmission that is intended to operate automatically, generally, utilizes a torque converter or a fluid coupling, designed so as to not transmit adequate torque at engine idling speeds to move the vehicle. Without changing the status of the transmission, then an increase in engine speed will increase the torque transmitted and initiate vehicle movement. This construction, although it offers a fluid start without any need for the driver to engage and disengage a clutch manually, results in reduced efficiency due to the fluid losses always present with the fluid coupling or torque converter continuously in the drive train. To eliminate these losses or at least modify them, it is common to by-pass the torque converter or fluid coupling, either partially or completely. However, this requires additional structure, usually a lock-up clutch and controls, which need to be calibrated very carefully for all of the various extreme and normal operating conditions. Often, then, the increase in efficiency is not justified by these costly and complex arrangements.

Accordingly, the invention provides a transmission wherein a fluid start is provided in a novel way with any fluid losses resulting therefrom having a minimum influence on the overall efficiency of the transmission.

By the invention and related to the objective mentioned just above, a hydrodynamic brake is combined with a planetary gear unit and constructed so as to not offer adequate reaction at low speeds for the gear unit to be capable of transmitting sufficient torque to revolve the gear unit output element. The hydrodynamic brake only handles a portion of input torque, and therefore, inefficiencies from fluid losses have a negligible effect upon overall operating efficiency.

In combining a hydrodynamic brake with a planetary gear unit for reaction purposes, the brake must necessarily be designed with some maximum reactive capacity in mind. However, this same brake may then, at low speeds, such as engine idling speeds, offer too much reaction and creep can occur. Also, if the hydrodynamic brake is combined with gearing, the stall speed of the brake may be too low, i.e., the speed at which, with the gear unit output element stopped, the brake will have maximum reactive capacity, and thereafter, even though the speed is increased, the brake will not have any greater capacity. If the stall speed is too low, the capacity may not be great enough to overcome maximum torque loads. Another problem is the need for filling and emptying the hydrodynamic brake properly under varying conditions.

With these concerns in mind, the invention affords a fluid deflecting member in the working circuit of the hydrodynamic brake both for reducing the resistant or reactive capacity of the brake and for increasing the stall speed thereof.

Also, the invention furnishes unique structure for removing the fluid deflecting member from the working circuit after a predetermined condition exists. Because once the need for the member has passed, it could interfere with the effective operation of the brake.

To overcome the brake filling problem, it is, by the invention, related to the torque loads so that a too abrupt filling cannot occur.

In carrying out the invention, according to one form thereof disclosed for demonstration purposes, two planetary gear units are arranged in series and each has input, output, and reaction elements. The first of these gear units has the input joined to a power source and the reaction element restrained from rotation in one direction by a hydrodynamic brake. The second gear unit has the output element drive related to some driven medium, and the reaction element held against rotation in one direction by a brake. The first gear unit has a clutch between the input element thereof and the input element of the second gear unit, and also has a reaction mass joined to the reaction element for balancing the inertias when this first gear unit clutch is engaged. In the second unit, a clutch is situated between the output element thereof and the output element of the first gear unit. Another clutch, which is referred to as an intermediate clutch, is placed between the first gear unit output element and the second gear unit input element.

With these gear connections and the clutches and brakes so arranged, four forward speeds can be obtained with the first drive ratio, the lowest speed drive available, being initiated by engaging the intermediate clutch. Both gear unit reaction elements are held, and therefore, both gear units contribute to the overall ratio. To establish second, the first gear unit clutch is engaged, which, by the connection, locks up the first gear unit, and the second gear unit, alone, determines the ratio. In going from second to third speed, a double transition must take place, most of which is completed prior to the change from second to third, and commences as soon as second speed has been established. In second, then, the first thing to occur is that the hydrodynamic brake is emptied after the first gear unit clutch has been engaged. Next, the intermediate clutch is disengaged, and the second unit clutch engaged. This sequence of events does not in any way alter the second speed ratio. To make the ratio change to third, only the hydrodynamic brake need be refilled whereupon the first gear unit becomes set for reduced drive and determines the drive ratio, the second gear unit being conditioned for direct drive. In going from third to fourth speed, the intermediate clutch is re-engaged locking up the first gear unit and an overall direct drive results.

In the control system for the transmission, provision is made both for engaging and disengaging the clutches in proper sequence during and before the second to third ratio change and for filling and emptying the hydrodynamic brake. By the construction, the hydrodynamic brake is provided with a fluid deflecting member for altering the characteristics of the hydrodynamic brake and its operation is likewise controlled by the system.

The foregoing and other objects and advantages of the invention will be apparent from the following description and from the accompanying drawings, in which:

FIGURE 1 illustrates how the various figures are combined to show the entire control system in schematic form; and FIGURES 2, 3, 4, 5, and 6 illustrate sections of the system and the hydraulic circuits employed to operate the transmission viewed diagrammatically in FIGURE 2.

GENERAL DIAGRAMMATIC ARRANGEMENT

Referring to FIGURE 2 of the drawings, the transmission viewed has a driving or power shaft 10 joined to some suitable power source, e.g., a vehicle engine (not shown), and a driven or load shaft 12 appropriately connected to a driven medium, for instance, the vehicle wheels. As will be explained, the transmission is capable of transferring drive between these shafts 10 and 12 in four different forward drive ratios and a reverse. This is accomplished through the agency of a series of planetary gear units, namely, a front planetary gear unit 14, a rear planetary gear unit 16, and a reverse planetary gear unit 18, positioned in this left to right order between shafts 10 and 12.

Describing first the front gear unit 14, it has an input ring gear 20 drive connected to the power shaft 10, a reaction sun gear 22, and an output planet carrier 24. Carrier 24 has journaled thereon a series of planet pinions 26 that intermesh with the ring and sun gears 20 and 22. As is well understood by those familiar with the art, the front gear unit 14 can be conditioned for a reduced speed drive, an overdrive, or a direct drive with the output carrier 24 always being driven forwardly at the established ratio. In this instance, a reduced speed drive is attained by resisting the backward rotational tendency of the reaction sun gear 22 through a hydrodynamic brake, denoted generally at 28. A direct drive is possible when a front unit clutch 30 is engaged by a piston type servo motor 31 and joins, as will become apparent, the output carrier 24 and the input ring gear 20.

The hydrodynamic brake 28, just referred to, comprises a stator 32 grounded at 34 and a rotor 36 that is drive connected to the reaction sun gear 22 through a one-way device, denoted at 38. The one-way device 38 may be of the usual kind employing rollers, sprags, or the like, so as to prevent relative rotation between two members in one direction only. In this installation, the one-way device 38 will lock when the front unit sun gear 22 revolves backwards and causes the rotor 36 to turn therewith. When the sun gear 22 rotates forwardly, of course, the device 38 will release and the rotor 36 will become inoperative. Both the stator 32 and the rotor 36 are provided with vanes and confront each other so that, when the hydrodynamic brake 28 is filled with fluid and the rotor 36 is revolved, the fluid will traverse the working circuit defined in a counterclockwise direction. Since the stator 32 cannot rotate, a churning effect takes place and the fluid will resist rotation of the rotor 36 producing the necessary reaction for the front unit 14.

Because the hydrodynamic brake 28 is filled with fluid in first speed to enable a fluid start, there can be a tendency for the vehicle to creep, particularly if the hydrodynamic brake 28 is more effective at engine idling speeds than needed. Therefore, to reduce the effectiveness, a fluid deflecting member or vanelike element 40 is moved into the working circuit so as to interrupt flow and thereby reduce the resistance from the churning to a point where no creep can occur.

Since the influence from the vane 40 is only wanted at certain times, provision is made for moving the vane 40 relative to the stator 32 and into and out of the working circuit. To do this, a servo motor 42 is employed that has slidable therein a piston 44 joined to the vane 40. A spring 46 biases the piston 44 and vane 40 to the demonstrated operative position. To remove the vane 40 from the working circuit, fluid pressure, which varies in direct proportion to the speed of the driven shaft 12, is utilized to oppose the spring 46 and acts on the opposite side of the piston 44. Consequently, at some predetermined vehicle speed, this pressure, which will be called governor pressure, will dominate and cause the vane 40 to be removed from the working circuit so that the hydrodynamic brake 28 again attains maximum effectiveness.

Another aspect of the vane 40 is that it increases the stall speed of the hydrodynamic brake 28. In explaining this feature, assume that in the front gear unit 14 the ring gear 20 has 60 teeth and the sun gear 22 has 30 teeth. With these proportions and the gear unit 14 set for reduced drive, 1.5 times input or vehicle engine torque will be delivered to the output carrier 24. Since reaction torque equals the difference between the output and input torques, the hydrodynamic brake 28 will be required to offer a resistance equivalent to .5 time input torque, and this, in turn, will enable the gear unit 14 to overcome a load on the carrier 24 slightly less than the 1.5 times input torque. If the engine delivers maximum torque at say 2000 r.p.m., the reaction sun gear 22 and the rotor 36, because of the indicated tooth proportions, could, if not adequately restricted, be revolved backwards, with the carrier 24 stalled, at a maximum speed of 4000 r.p.m. It can be seen now that if, because of dimensional limitations, the .5 time input torque resistance is obtainable at a low stall speed, e.g., 900 r.p.m., the engine would be only revolving at 450 r.p.m. A 450 r.p.m. engine speed is obviously too slow to develop any appreciable torque and certainly is far below the 2000 r.p.m. needed to develop maximum engine torque. Hence, a maximum load on the carrier 24 could not be overcome and any increase in engine speed would simply revolve the rotor 36 faster without increasing the maximum reaction already afforded by the brake 28. Necessarily, the reaction would have to be increased and since it does not, the increased speed of the rotor 36 will only churn the fluid in the hydrodynamic brake and generate excessive heat.

The installation of a vane, such as vane 40, into the working circuit of this hydrodynamic brake having a 900 r.p.m. stall speed will reduce its reactive capacity at 900 r.p.m. With the reduced effectiveness, the rotor 36 will have to be revolved faster if the same 900 r.p.m. reactive capacity is to be realized. This, of course, is desirable, for now with a proper selection of component sizes, conceivably it could become necessary to rotate the rotor 36 at the mentioned 4000 r.p.m. speed so as to take advantage of maximum engine torque. In effect, then, the vane 40 reduces the design capacity of the brake at a given speed, but this capacity can be recovered simply by increasing the speed.

The torque figures are only intended to be exemplary, but it can be seen that a 900 r.p.m. stall speed can be increased by the use of the vane 40 and by selecting the proper dimensional proportions. Once movement of the vehicle has been commenced under these extreme road load conditions, the problem changes and then the governor pressure will remove the vane 40 from the working circuit so that the maximum efficiency of the hydrodynamic brake 28 is regained.

Further enhancing the smoothness of the shifts or ratio changes through the front gear unit 14 is the utilization of an inertia mass or weight 48 that is revolvable with the reaction sun gear 22. For whenever the clutch 30 is engaged to accomplish a shift from underdrive to direct drive through the gear unit 14, there can be a very noticeable shock or jar resulting from the torque produced by the deceleration of the engine connected parts. This is due to the fact that the inertia of the engine connected parts, which are decelerated, is greater than that of the clutched or reaction parts, which are accelerated. As a result, there is an imbalance of forces to the carrier 24. The reaction mass 48 not only smoothens the shift but permits the clutch 30 to be engaged quickly. Therefore, the weight of the reaction mass 48 is, of course, critical and may be produced, e.g., by filling a container with the proper quantity of fluid or by employing some solid material of a selected weight.

To determine the weight needed, the foregoing front unit tooth proportions are again used. Also, it is assumed that the front unit 14 is set for an underdrive, and that the output carrier 24 is being rotated forwardly at 1000 r.p.m. With these conditions, the input ring gear 20 will be revolving 1.5 times the speed of carrier 24 or 1500 r.p.m. When a transition or shift is made to direct drive, the speed of the stationary sun gear 22 must be accelerated to 1000 r.p.m., while the speed of the ring gear 20 and the power shaft 10 must be decelerated 500 revolutions to 1000 r.p.m. Continuing with these figures and using the symbol IE to represent inertia of the engine connected parts, namely, the power shaft 10 and the ring gear 20, and the symbol ER to designate the inertia of the reaction parts, sun gear 22, then for the inertias to be balanced, the equation IE equals IR, must be satisfied. If we substitute in the equation the above acceleration and deceleration r.p.m. values, it becomes 500 IE equals 1000 IR. Once IE has been ascertained, IR can be determined, and the weight of the reaction mass 48 made such that it and the sun gear 22 together provide the necessary inertia for balancing the equation. With the inertias of the clutched parts equated according to the formula, the front unit clutch 30 will be engaged smoothly and without discernment by the vehicle operator.

A reaction ring gear 50 and an input sun gear 52 mesh with a series of planet pinions 54 journaled on an output planet carrier 56 and this assemblage constitutes the ring gear unit 16. For a reduction drive through the rear gear unit 16, a one-way device 58, similar to device 38, is combined with a rear unit brake 60, fluid actuated by a piston type servo motor 62. The brake 60 and the one-way device 58 together, when operative, prevent reverse rotation of the rear gear unit ring gear 50, but permit forward rotation when the gear unit 16 is locked up for direct drive.

Before the direct drive aspect of the rear gear unit 16 is discussed, it is here pointed out that drive from the front gear unit 14 may be made via two different paths to the rear gear unit 16. One of these paths is through the front unit clutch 30, which clutches together the power shaft 10 along with the front unit ring gear 20 with the rear unit input sun gear 52. By the other path, drive is transferred to the rear unit sun gear 52 from the front unit carrier 24 by an intermediate clutch 64, which is engaged by a servo motor 66 of the same character as the previously mentioned servo motors.

So that the rear gear unit 16 may be locked up for a direct drive, a rear gear unit clutch 68, fluid actuated by servo motor 70, is installed between the front and rear unit carriers 24 and 56 and combines with the intermediate clutch 64 to connect together the rear unit carrier 56 and the rear unit sun gear 52. As a result, drive at a one to one ratio is transferred by the rear unit output carrier 56 to the attached load shaft 12. A more detailed explanation of the relationship of the rear gear unit 16 to the front gear unit 14 will be made hereinafter.

In the reverse gear unit 18, immediately to the right of the rear gear unit 16, an input sun gear 72 is combined with a reaction ring gear 74 that is held against rotation in either direction by a reverse unit brake 76 when engaged by a fluid pressure actuated servo motor 78. Both of the gears 72 and 74 mesh with one or more planet pinions 80 journaled on an output carrier 82. The output carrier 82 is drive related to the load shaft 12 so that, with the reverse unit brake 76 engaged, the output carrier 82 will be revolved backwardly at a reduced speed by the reversely rotating rear input sun gear 72, in a way to be described.

By coordinating the sequence of events taking place in the transmission, the four forward and reverse ratios are obtainable along with a neutral, substantially as follows.

For neutral, the hydrodynamic brake 28 is filled and is operative with vane 40 in the illustrated position. Also, the rear unit brake 60 is engaged. With only these two brakes 28 and 60 operative, the front gear unit 14 is prepared to deliver a reduced speed drive to the front unit carrier 24, but since the front unit clutch 30, the intermediate clutch 64, and the rear unit clutch 68 are all disengaged, drive cannot proceed to the rear gear unit 16, hence the neutral no-drive status. The described neutral arrangement is advantageous for when forward drive is desired in the first speed ratio, only the intermediate clutch 64 need be engaged. This is preferable to the engagement of a brake in going from neutral to a forward drive status since the brake produces a pronounced engaging sensation that the driver feels, while the clutch, as the intermediate clutch 64, renders a soft gradual engagement without the abruptness.

With first speed established, the intermediate clutch 64 being now engaged, the front gear unit 14 will deliver torque at a reduced speed to the front unit carrier 24 whereupon the intermediate clutch 64 will transfer this torque to the rear unit input sun gear 52. The backward rotational tendency of the rear unit reaction gear 50 is resisted through one way device 58 by the rear unit brake 60, and therefore, the rear unit output carrier 56 will drive the load shaft 12 at a further reduced speed, the overall ratio of drive being determined by both the front and rear gear units 14 and 16. The hydrodynamic brake 28, through one-way device 38, holds the front unit reaction gear 22 against rotation although the vane 40 is in the operative position, but as soon as the vehicle speed increases, by way of example, to the equvalent of 2 or 3 m.p.h., the resultant governor pressure in acting on the piston 44 will remove the vane 40 from the working circuit of the hydrodynamic brake 28 and the brake 28 will again resume full effectiveness.

To obtain the second speed ratio, the front unit clutch 30 is engaged and this clutches both the front unit input ring gear 20 and the power shaft 10 directly to the rear unit input sun gear 52. Consequently, as can be observed, the front unit clutch 30 and the intermediate clutch 64, respectively, join the front unit carrier 24 and the front unit ring gear 20 to the rear unit sun gear 52. With two elements of the front gear unit 14 so joined, no relative rotation can take place and a direct drive results with the rear unit sun gear 52 being revolved at the same speed as the power shaft 10. The overall ratio in second speed then is determined entirely by the rear gear unit 16, which still is set for a reduced drive. When the front gear unit 14 is locked up, the reaction sun gear 22 revolves forwardly and assumes the direct drive speed without interference from the hydrodynamic brake 28 due to the release of the drive connection therebetween by the one-way device 38.

Once the vehicle is proceeding in second speed, a series of significant events occur that avoid the complicated double transition ratio change. For in going from second to third speed, the front unit 14 must regain its reduction drive status and the rear gear unit must be transformed into a direct drive unit. To accomplish this, the hydrodynamic brake 28 is emptied first, and then, fluid losses are no longer a factor in second speed. Next, the intermediate clutch 64 is disengaged, and then, the rear unit clutch 68 is engaged. Going through this cycle, it can be seen that the draining of the hydrodynamic brake 28 does not alter the second speed status in any way since it is already ineffective because of the release of the one-way device 38. The disengagement of the intermediate clutch 64 does not interrupt drive to the rear unit 16, for the rear unit input sun gear 52 is driven directly from the power shaft 10 through the front unit clutch 30. The fact that the disengagement of the intermediate clutch 64 unlocks the front gear unit 14 is of no concern, the front gear unit 14 being, in effect, by-passed in the drive train at this time. Upon the engagement of the rear unit clutch 68, the front and rear unit carriers 24 and 56 are clutched together, but this also is of no consequence in altering the second speed drive because the hydrodynamic brake 28 has been drained of fluid eliminating reaction for the front gear unit 14 and so drive continues from power shaft 10 through front unit clutch 30, rear unit sun gear 52, and thence, via rear unit carrier 56 to load shaft 12.

Shifting to third speed is now very simple, even though a double transition shift, since the gear unit 16 has been completely prepared for the ratio change and only the front gear unit 14 must be conditioned, which is done by filling the hydrodynamic brake 28. This, in itself, is desirable since the fluid inherently will absorb any drive train shocks that could otherwise produce a rough shift. With the hydrodynamic brake 28 filled and operative, reaction for the front gear unit 14 is restored, backward rotation of the front unit sun gear 22 is resisted, and consequently, the front unit carrier 24 will drive the load shaft 12 at this same reduced speed directly through the rear unit clutch 68 and carrier 56.

The front unit clutch 30 desirably remains engaged in third speed so as to not complicate the transition in any way, but does not influence the described third speed drive train. This is easily explained, the reason being that the front unit clutch 30 causes the rear unit sun gear 52 to be revolved faster than the rear unit carrier 56. As a result, the rear unit reaction ring gear 50 will revolve forwardly unrestricted and the one-way device 58 will release, removing the possibility of the rear gear unit 16 influencing third speed ratio, reaction having been eliminated. Actually, because of the connection between the front and rear unit carries 24 and 56, the rear unit 16 is not locked up, but is just ineffective as the front unit 14 was during a phase of second speed operation.

The attainment of fourth speed is likewise simple requiring only that the intermediate clutch 64 be engaged, which, as explained, combines with rear unit clutch 68 to prevent relative rotation between the rear gear unit carrier 56 and the rear gear unit sun gear 52, resulting now in a true lock-up of the rear gear unit 16. Since the front gear unit 14 is already locked up, the load shaft 12 will be rotated at the same speed as the power shaft 10 with no fluid losses to be considered in determining the efficiency of the drive train.

For reverse, both the reverse gear unit brake 76 and the intermediate clutch 64 are engaged and the hydrodynamic brake 28 is filled. Whereupon, drive is transferred from the power shaft 10 through the front gear unit 14 and proceeds from the front gear unit carrier 24 through intermediate clutch 64 to the rear gear unit sun gear 52 at a reduced speed in a forward direction. Since the rear gear unit brake 60 is released, the rear gear unit reaction gear 50 can and does rotate backwards and carries therewith the reverse unit input sun gear 72. With the reverse unit reaction ring gear 74 held, the reverse unit carrier 82 will also revolve backwardly and revolve the load shaft 12 at a reduced speed determined by all of the gear units.

In review, it can be observed that each of the different forward drive ratios only requires one operation at the time of the change, for instance, going from neutral to forward drive, and in the first speed status, only the intermediate clutch 64 is engaged, from first to second the front unit clutch 30 is engaged, from second to third the hydrodynamic brake 28 is refilled, and from third to fourth the intermediate clutch 64 is re-engaged.

CONTROL SYSTEM

Fluid pressure for operating the control system, which, in turn, automatically actuates the various servo motors, previously mentioned, is supplied both by a front pump 84 and a rear pump 86. In this embodiment, preferably, the front pump 84 is driven at a speed proportional to that of the power shaft 10 and the rear pump 86 at a speed proportional to that of the load shaft 12, both drive connections being made by suitable structure (not shown). Consequently, the front pump 84 becomes effective as soon as the vehicle engine is started and the rear pump 86 when vehicle movement commences.

The front pump 84 is of the variable capacity type similar in major details to that disclosed in the application of Walter B. Herndon, S.N. 140,176, filed January 24, 1950, now abandoned, and entitled Variable Capacity Pressure System. Since the front pump 84 does not constitute any part of the invention, a detailed explanation is not believed necessary other than to correlate the pump 84 with the system. Briefly, then, as viewed in the lower left part of FIGURE 3, a spring 88 is utilized to bias a slide 90 upwardly to its topmost position, which corresponds to that for maximum output. When the pump 84 is revolved fluid is drawn via a suction line 92 from a sump 93 and is discharged under pressure into a main supply line 94. Top and bottom slide supply lines 96 and 98, respectively, communicate with the guideway for the slide 90 near the top and bottom thereof and serve to vary the output of the pump 84. The operation of these lines in connection with a pressure regulator valve 100 will be more completely covered later.

The rear pump 86 may be of any known type and here is demonstrated as a positive type gear pump. When pump 86 is driven, fluid is transferred from a sump 93 through a suction line 102 and delivered under pressure to a discharge line 104 in communication with the main supply line 94.

Both the front pump 84 and the rear pump 86 discharge into the same main supply line 94, the relative proportions of their contributions being determined by the installation and the speed at which each is operated. If wanted, a valve, or the like, may be installed so that when the output from the rear pump 86 is adequate the front pump 84 may be relieved by connecting its discharge side to the sump 93.

A branch 106 of the rear pump discharge line 104 conducts fluid pressure to a governor 108 demonstrated schematically and driven at a speed proportional to the speed of the load shaft 12. Any suitable governor that, preferably, causes a pressure that is proportional to the speed of the load shaft 12 to be developed from line pressure may be employed, e.g., a governor similar to that demonstrated and described in the patent to Thompson 2,204,872, issued January 18, 1940. Two stages of governor pressure, hereinafter referred to as G–1 and G–2 pressures, are produced by the governor each increasing with vehicle speed but at a different rate. G–1 pressure, which is afforded first, i.e., it is produced as soon as the vehicle moves and the governor 108 is revolved, is delivered to a G–1 pressure supply line 110. G–2 pressure, which will be produced at a somewhat higher vehicle speed and at a slower rate than G–1 pressure, is supplied to a G–2 pressure supply line 112. These governor pressures and their relationship to the system will be described in the operational summary.

*Manual Valve*

A valve body is provided with a series of bores each of which houses the different valves included in the control system. One of these bores at the top of FIGURE 4 has slidable therein the manual valve, denoted generally at 114. The manual valve 114 functions as a distributor for fluid pressure delivered through the bore thereof by a port communicating with a branch 116 of the main supply line 94, distribution being determined by the alignment of spaced lands 118, 120 and 122 on the valve. Maneuvering of the valve 114 is accomplished by a fork, or similar instrument that is inserted between the spaced flanges 124 and 126 on the extreme right end of the valve 114. The different positions the manual valve 114 assumes are indicated by the lines and the corresponding legends, which, reading left to right, are Park, Neutral, Drive Range 4, Drive Range 3, Low Range, and Reverse. A suitable lever accessible to the driver operates the manual valve 114 in a known manner. The other ports communicating with the bore of the manual valve 114 will be identified later along with their relationship to the overall system.

*Throttle Valve*

Another branch 128 of the main supply line 94 extends to the bore situated immediately below the manual valve 114 in FIGURE 4 in which bore a throttle valve, assigned the numeral 130, is slidably stationed. This valve 130 consists of a throttle responsive member 132 that may be appropriately actuated in a well known manner by a conventional accelerator pedal (not shown), a regulating valve member 134, and a spring 136 interposed between these members 132 and 134. The throttle responsive member 132 has a single land 138 thereon against which one end of the spring 136 abuts and due to actuation by the accelerator pedal has movement proportioned to the opening and closing movements of the vehicle engine throttle. Regulating valve member 134 has formed thereon spaced lands 140, 142, and 144.

The operation of the throttle valve 130, being basically regulatory, is well known, i.e., as the accelerator pedal or throttle is moved to increase the carburetor throttle opening, throttle responsive member 132 will be moved to the left, as viewed in FIGURE 4, thereby compressing spring 136 and forcing regulating valve member 134 likewise to the left so that land 140 will crack or slightly open the port communicating with a branch 146 of a throttle valve pressure supply line 148. When this occurs fluid pressure from the main supply line 94 may proceed via branch 128 between lands 140 and 142, through branch 146, and to the throttle valve pressure supply line 148. The fluid pressure in the line 148 is then introduced by a restricted branch 150 thereof to the left end area of land 140. As the pressure increases it will move the regulating valve member 134 to the right initially closing the port connected to branch 146 and subsequently establishing a connection between an exhaust port 152 and a relief branch 154 of the throttle valve pressure supply line 148. As the throttle opening is increased the force exerted on the regulating valve member 134 urging it to the right will increase and require a greater developed pressure acting on the left end to move the valve member 134 to the exhaust position. Therefore, in this manner, throttle valve pressure or TV pressure, as it will be referred to at times, increases as the throttle opens. TV pressure, as will become apparent in the description of the operation, combines with governor pressure to establish points at which ratio changes occur or shift points.

*Detent Valve*

Just below the throttle valve 130 and in FIGURE 4, the detent valve, denoted at 156, is slidably situated in another valve body bore. The detent valve 156 is formed with a series of spaced lands 158, 160, 162, 164, 166, and 168 that control the various ports in the bore, as will be described. The function of the detent valve is to produce forced downshifts or, as they are sometimes called, detent downshifts that occur when the accelerator pedal is depressed beyond the full throttle position. This movement of the accelerator pedal may be transferred to the stem end of the detent valve 156 by an appropriate arrangement, not shown, the action being well known. The ports for the bore of detent valve 156 and the detent valves relationship to the system will be described during the operational description.

*Hydrodynamic Brake Supply and Exhaust Valve*

Located in the bottom right part of FIGURE 5 and denoted generally at 170 is a hydrodynamic brake supply and exhaust valve comprising a supply valve element 172 provided with lands 174, 176, and 178, a spring 180 that urges the supply valve element 172 to the viewed position, and an exhaust valve element 182 formed with a large land 184 and a small land 186. A wall 188 in the bore separates the two valve elements 172 and 182 so that contact therebetween is made only through the small land 186, which is slidable in an opening in the wall 188. The hydrodynamic brake supply and exhaust valve 170 determines when the hydrodynamic brake is to be furnished with fluid pressure and when it is to be exhausted or drained. To accomplish this exhaust function a hydrodynamic brake exhaust line 190 communicates with an exhaust port 192 in the bore for the exhaust valve element 182, and as viewed, the hydrodynamic brake would be drained in this manner. For filling the hydrodynamic brake 28 fluid pressure is delivered to a control line 194 that extends to the right end of the supply valve element 172 and via a branch 196 thereof to the right end of exhaust valve element 182. As a result, the bias from spring 180 is overcome and the entire valve train is shifted to the left, so that land 176 will initially close an air vent 198, which had been in communication with the port connected to the hydrodynamic brake feed line 200, and then establishes communication between the ports connected to the hydrodynamic brake feed line 200 and an inlet line 202. The purpose of the air vent is to prevent the possibility of any partial vacuum formation in the hydrodynamic brake 28 when being drained that would otherwise impede a rapid drain of the brake.

Hydrodynamic Brake Supply Rate Valve

The hydrodynamic brake supply rate valve, indicated by the numeral 204, is illustrated in FIGURE 5 to the left of the hydrodynamic brake supply and exhaust valve 170. This valve 204 has spaced lands 206 and 208 formed thereon and is urged upwardly by a spring 210. The purpose of the valve 204 is to control the rate of pressure fluid supplied to the inlet line 202 for the hydrodynamic brake supply and exhaust valve 170 from a branch 212 of the main supply line 94. The variations in the rate is accomplished by two parallel so-called primary and secondary orifices 214 and 216 located at the point where line 202 and branch 212 merge. For the maximum supply rate, which occurs in the demonstrated position of the rate valve 204, pressure fluid in branch 212 proceeds both through the primary orifice 214, being always effective, to inlet line 202, and between the lands 206 and 208 and through the secondary orifice 216 to the inlet line 202. The other and minimum rate is established by the action of TV pressure in the supply line 148 on the upper end of the rate valve 204. When TV pressure is of a predetermined value the valve 204 will be forced downwardly until the port leading to the secondary orifice 216 is closed. The reduced rate is then determined entirely by the primary orifice 214.

With this construction TV pressure relates torque demand to the rate at which the hydrodynamic brake 28 is filled. As will become more apparent from the description of the operation of the control system, any extreme torque demand, e.g., that occurring when the throttle is fully opened could conceivably if the hydrodynamic brake was filled too rapidly result in an appreciable reduction in the pressure of the fluid supplied to certain of the servo motors. Consequently, due to the pressure drop, any or all of the pressure engaged clutches or brakes could wholly or partially release and cause the transmission to malfunction. This is possible particularly with the rear unt brake 60, since the reaction load is substantial, and a partial release would interrupt the drive connection with resultant engine runaway, an undesirable sensation.

Rear Unit Brake Valve

Viewed in the lower right section of FIGURE 6 the rear unit brake valve, identified generally by the numeral 218, consists of two parts, viz., a main valve part 220 and a plug valve part 222, both arranged in axial alignment. The main valve part has spaced lands 224, 226, 228, and 230 and is urged into engagement with the plug valve part 222 by a spring 232. The valve 218 functions somewhat like a relay valve in that it causes the rear unit brake 60 to be disengaged in reverse. This function and the relationship to the overall system will be described more completely in the operational summary.

First to Second Shift Valve

The first to second shift valve, shown generally to the right of the rear unit brake valve 218 at 234 in FIGURE 6, is biased by a spring 236 to the depicted downshifted position and has three equal diameter lands 238, 240, and 242 and a larger diameter land 244. Valve 234 produces, as its name implies, a first to second shift or ratio change in a way to be described.

Intermediate Clutch Control Valve

Just above the first to second shift valve 234 in the control system diagram and slidable in another of the valve body bores is an intermediate clutch control valve, denoted at 246. Valve 246 is generally of the spool type with lands 248 and 250 and is biased to the left by a spring 252. Briefly, since a detailed explanation will be made in the operational description the valve 246 serves to drain the intermediate clutch servo motor 66 and thereby disengage the intermediate clutch 64 whenever the front unit clutch servo motor 31 is supplied with fluid pressure.

Rear Unit Clutch Control Valve

The rear unit clutch control valve, designated at 254 and situated just above the rear unit brake valve 218 in FIGURE 6, becomes operative when the front unit clutch 30 is engaged, as does the intermediate clutch control valve 246, to transfer fluid pressure to the rear unit servo motor 70 and effect an engagement of the rear unit clutch 68. Valve 254 has two relatively large diameter lands 256 and 258 and is biased to the demonstrated inoperative position by a spring 260. The diameters of these lands are selected to obtain an accumulator effect for reasons that will become apparent.

Second to Third Shift Valve

A second to third shift valve train is mounted for sliding movement in a stepped valve body bore, as depicted in FIGURE 5 immediately above the hydrodynamic brake supply and exhaust valve 170. The train comprises a shift valve proper, indicated at 262, a governor plug valve 264 situated on the right side of the shift valve proper 262, and a regulator plug valve 266 located on the shift valve proper's left side. A large spring 268 urges both the shift valve 262 and the governor plug valve 264 to the right, the downshifted position, whereas another smaller spring 270 acts to bias the shift valve 262 and the regulator plug valve 266 apart. The shift valve 262 has a large diameter land 272 and four smaller equal dameter lands 274, 276, 278, and 280; the governor plug valve 264 has a large diameter land 282, an intermediate diameter land 284 and a relatively small diameter land 286.

The regulator plug valve 266 acts to modulate the regulated TV pressure in the TV pressure supply line 148, which extends to the left end of the regulator plug valve 166, as follows: When the TV pressure builds up to a point adequate to overcome the bias from the spring 270 the regulator plug valve 266 will be shifted far enough to the right to open the port connected to a cross-line 288 extending to the spring pocket 290. This fluid pressure will acts on the opposite end of the regulator plug valve 266 and move it leftwardly until a port connected to a low range supply line 292 is opened, whereupon this pressure will be relieved through an exhaust port 293 in the bore of the manual valve 114. As the TV pressure increases the modulated TV pressure produced in this manner will increase in order to move the regulator plug valve 266 a distance required to produce the relief and continue the regulation.

The operation of the second to third shift valve train with relation to the control system will be covered in the operational description.

Third to Fourth Shift Valve

The third to fourth shift valve train is demonstrated at the top left section of FIGURE 6 and is somewhat similar to the second to third shift valve train in that it has slidable in an axially aligned stepped bore a shift valve proper 294, a governor plug valve 296, and a regulator plug valve 298. Shift valve 294 has a large diameter land 300, a small diameter land 302, and two intermediate diameter lands 304 and 306, and the governor plug valve 296 is furnished two equal diameter lands 308 and 310. A spring 312 urges the third to fourth shift valve 294 towards the downshifted position, whereas a spring 314 is interposed between the regulator plug valve 298 and the shift valve 294 and biases them apart.

As the second to third regulator plug valve 266 the third to fourth regulator plug valve 298 also develops a modulated TV pressure and in much the same manner. TV pressure in the supply line 148 acts on the left end of the regulator plug valve 298 and forces it to the right when TV pressure is of a selected value against the bias from the spring 314. A port in communication with a cross-line 316 is as a result opened, and this fluid pressure proceeds to the spring pocket 318 where it acts on the opposite end of the regulator plug valve 298. The fluid pressure in the spring pocket when sufficient will shift regulator plug valve 298 leftwardly until the port connected to a line 320 extending to the bore of the manual valve 114 is opened, whereupon this pressure will be relieved out the exhaust port 293 in the manual valve bore. This operation will continue and the modulated TV pressure will continue to build up in proportion to TV pressure as the force needed to produce the relief aspect of the regulator plug valve 298 increases.

The ports and their identification with the system as well as the operation of the third to fourth shift valve will be explained in greater detail later.

OPERATION

The operation of the control system with respect to the transmission will be described in the same sequence as the settings of the manual valve 114 are indicated by FIGURE 4 in moving from left to right, namely, Park, Neutral, Drive Range 4, Drive Range 3, Low, and Reverse.

Park and Neutral

It is intended that the vehicle engine may only be started in either the Park or Neutral settings of the manual valve 114 and further that a suitable dog or pawl in the Park setting engages and holds the load shaft 12, or an associated part, from rotation in either direction. Therefore, as soon as the engine is started the front pump 84 will be revolved and commence to draw fluid from the sump 93 through suction line 92, discharging this fluid under pressure into the main supply line 94.

The amount of fluid pressure developed by the front pump 84 is determined by the pressure regulator valve 100. As seen, valve 100 is slidable in a valve body bore provided therefor and includes spaced equal diameter lands 322, 324, 326, and 328 and a larger diameter land 330. The left end of the valve 100 is provided with a central bore 332 that is intersected by a cross-orifice 334 located between lands 324 and 326. A spring 336 is interposed between the land 330 and a plug valve 338 and exerts a predetermined leftward bias intended to develop approximately, by way of example, a 95 p.s.i. line pressure. As soon as fluid pressure exists in the main supply line 94 a branch 340 thereof will transfer this fluid pressure to the left end of the pressure regulator valve 100, and if less than the predetermined desired pressure the spring 336 will position the valve 100 so that cross-orifice 334 is aligned with the port connected to the bottom slide supply line 98. This fluid pressure then will be transferred to the bottom of the slide 90 and move it upwardly to its maximum delivery position. When the fluid pressure delivered by the front pump 84 reaches or exceeds the maximum desired pressure the pressure regulator valve 100 will be forced to the right until the cross-orifice 334 is aligned with the port connected to the top slide supply line 96; the fluid pressure so transferred will move the slide 90 downwardly and reduce the pump output volume. The foregoing regulating action is continuous as the regulator valve 100 moves between these top slide and bottom slide positions, the result being that the fluid pressure in the main supply line 94 is maintained relatively constant.

The suction line 92 for the front pump 84 also communicates with ports in the pressure regulator valve bore so as to carry away any excess fluid pressure developed during reciprocating movement of the valve 100.

With the pressure regulator valve 100 operating in the above described way fluid pressure now will exist at the pressure determined by the regulator valve 100 in the main supply line 94 and will be transferred by the branch 116 thereof to the bore of the manual valve 114. The lands 120 and 122 on the manual valve 114 will connect the port for the branch 116 with ports connected to lines 342 and 344, both of which extend to the detent valve 156. Assuming the detent valve 156 is in the depicted position lands 158 and 160 thereon will block further progress of the fluid pressure in line 342 while lands 166 and 168 thereon will join the ports connected to the line 344 and an outgoing line 346 to the third to fourth shift valve 294. With the third to fourth shift valve in the illustrated downshifted position land 304 will halt progress of fluid pressure in the outgoing line 346 from the detent valve 156.

The main supply line 94 terminates at a port in the bore of the rear unit brake valve 218 where further advance is stopped by the rear unit brake valve lands 224 and 226. However, the rear unit brake valve lands 228 and 230 align ports connected to a branch 348 of the main supply line 94 and a rear unit brake supply line 350, the latter of which extends to the rear unit brake servo motor 62. This fluid connection therefore will engage the rear unit brake 60.

Another branch 352 of the main supply line 94 extends to a port in the first to second shift valve bore at which point, with the shift valve 234 in the downshifted position, the lands 238 and 240 will connect the port for branch 352 with a port to line 354 extending to the port of the second to third shift valve 262. Since the second to third shift valve 262 is in the downshifted position, the fluid pressure in line 354 will proceed between lands 276 and 278 to control line 194 and branch 196 thereof. This fluid pressure in acting on the face area of the exhaust valve element 182 and the hydrodynamic brake supply and exhaust valve 170 will force both to the left cutting off communication between the hydrodynamic brake and exhaust line 190 and exhaust port 192 while establishing communication between line 202 and the hydrodynamic brake feed line 200 through lands 174 and 176 on the supply valve element 172. Fluid pressure for filling the hydrodynamic brake 28 comes from the main supply line 94 through branch 212, through line 202 and through both the primary and secondary orifices 214 and 216 if it is assumed that the hydrodynamic brake supply rate valve 204 is in its uppermost position, which it normally would be.

Although the rear pump 86 is inoperative, the vehicle being stationary, fluid pressure from the front pump 84 is transferred by the rear pump discharge line 104 and branch 106 thereof to the governor 108 from the main supply line 94. If desired, the governor can be constructed to provide a minimum G–1 pressure, say 5 p.s.i., even though the vehicle is not moving. This minimum G–1 pressure would be delivered by the supply line 110 directly to the second to third shift valve 262; by a branch 356 to the third to fourth shift valve 294, between lands 300 and 304 thereof, through the bore of the third to fourth shift valve 294, and to the end area of land 244 on the first to second shift valve 234; and by a branch 358 to the servo motor 42 for operating the hydrodynamic brake vane 40.

From the preceding, only the hydrodynamic brake 28 and the rear unit brake 60 are operative in Park or Neutral; all other clutches and brakes are exhausted, and therefore, no drive can take place through the rear gear unit 16, since, as has been explained, there is no connection with the front gear unit 14. The manner of exhausting each of the other clutches and brake will be covered in detail as the description of the sequential operation proceeds.

Drive Range 4

When it is desired to move the vehicle forwardly the manual valve 114 is moved to one of the forward drive settings, either the Drive Range 4, the Drive Range 3, or the Low Range setting. The first of these, the Drive Range 4 setting, is encountered in going from the Neutral setting and will be now discussed.

In the Drive Range 4 setting the manual valve land 122 will assume the viewed position and fluid pressure communication will be established between the main supply line branch 116 and a Drive Range 4 supply line 360, extending to the second to third shift valve 262. Since the second to third shift valve 262 is in the downshifted position, the lands 274 and 276 thereon prevent fluid flow beyond this point. A branch 362 of the Drive Range 4 supply line 360 continues to the bore of the detent valve 156, and there is blocked by the detent valve lands 162 and 164. Similarly and as mentioned before, the line 342 from the manual valve 114 communicates with the bore of the detent valve 156, but fluid pressure therein cannot proceed further being cut off by detent valve lands 158 and 160. Line 344, as in Park and Neutral, transfers fluid pressure through the bore of the detent valve 156 and via line 346 to the third to fourth shift valve 294. Another branch 364 of the Drive Range 4 supply line 360 communicates with the bore for the rear unit brake valve 218, and fluid pressure therein is transferred between rear unit brake valve lands 226 and 228 with the brake valve 218 in the position shown by an adjacent port to a line 365 extending to the bore of the intermediate clutch control valve 246. Since the spring 252 will hold the intermediate clutch control valve 246 in the illustrated position, fluid pressure may continue through a line 366 extending to the second to third shift valve 262 between lands 278 and 280 and via an intermediate clutch supply line 367 to the intermediate clutch servo motor 66. Fluid pressure so delivered to the servo motor 66 will cause the intermediate clutch 64 to engage.

In the line 365 upstream of the intermediate clutch control valve 246 a restriction 368 is formed that cooperates with an intermediate clutch accumulator 370 in the line 366 so as to insure that filling both the accumulator 370 and the chamber for the intermediate clutch servo motor 66 does not reduce the main line pressure appreciably. Also, the accumulator 370 coacts with a rear unit accumulator 372 in the timing of shifts between second and third speeds. The structure of the intermediate clutch accumulator 370 will be like that of the rear unit clutch accumulator 372, to be explained.

A branch 374 of the line 365 extends to the bore of the rear unit clutch control valve 254, but fluid pressure therein is stopped from further progress in the control system by the disposition of lands 256 and 258 on the rear unit clutch control valve 254 when in the viewed position. Consequently, the rear unit clutch 68 remains disengaged.

When the control system valving assumes the foregoing positions the hydrodynamic brake 28 is operative and both the intermediate clutch 64 and the rear unit brake 60 are engaged. The transmission is now set for drive in the first speed ratio; the resultant drive train, as previously described, is such that both the front and rear gear units 14 and 16 are conditioned for reduced speed drive.

Because the engine is still idling, the reaction offered by the hydrodynamic brake 28 is not yet sufficient to produce a drive, and hence, the vehicle will remain stationary, the vane 40 functioning to keep the hydrodynamic brake 28 ineffective so that creep cannot occur. Also, the throttle valve 130, which is supplied main line pressure via branch 128, preferably does not produce any pressure with the engine idling.

First Speed Ratio

Upon an increase in engine speed caused by opening the engine throttle the reaction resistance from the hydrodynamic brake 28 will increase sufficiently for the front gear unit 14 to commence rotation of the output carrier 24 thereof. Drive through the intermediate clutch 64 to the rear unit sun gear 52 will start, and the load shaft 12 will be revolved starting vehicle movement. TV pressure will now exist in the TV pressure supply line 148, being produced as described in the explanation of its operation earlier.

The first to second shift valve 234, being in the downshifted position, will cause a front unit clutch supply line 376 to be relieved through an exhaust port 378 in the bore thereof, and as a result, the front unit clutch 30 will remain disengaged. Also, a reverse brake supply line 380 communicates via a branch 382 with the exhaust port 363 in the manual valve bore, and therefore, the reverse brake 76 is maintained disengaged. The development of throttle pressure will commence the operation of the second to third regulator plug valve 266 and the third to fourth regulator plug valve 298, so that they both produce modulated TV pressure in the manner previously described.

G-1 pressure in the G-1 supply line 110 will be distributed, as explained, but now upon attainment of some selected speed, e.g., 2 or 3 m.p.h., will cause the hydrodynamic brake vane 40 to be removed from the working circuit thereof, so that the hydrodynamic brake 28 will attain its maximum effectiveness. G-2 pressure is also developed when vehicle speed increases sufficiently and is furnished by G-2 pressure supply line 112 to the second to third shift valve 262 between lands 272 and 274 thereon and via a branch 384 thereof to the end area of the third to fourth governor plug valve 298. Movement of the vehicle likewise starts operation of the rear pump 86, and it too contributes to the control system.

Until a predetermined vehicle speed is attained, e.g. 7 or 8 m.p.h., the transmission will continue to operate in its first speed ratio with fluid pressure distribution taking place as just explained.

Shift First to Second

With the vehicle progressing forwardly at an increasing speed the load shaft 12 will drive the governor 108 at such a speed that the G-1 pressure developed thereby and delivered by branch 356 of the G-1 pressure supply line 310 to the first to second shift valve 234 will be sufficient to overcome both the force from the spring 236 and that from TV pressure acting on the differential areas determined by lands 242 and 244 thereon. The first to second shift valve 234 will then move to the left, as viewed, and to the upshifted position in which communication is established by lands 240 and 242 between branch 352 of the main supply line 94 and the front unit clutch supply line 376 and by lands 238 and 240 between line 354 extending to the second to third shift valve and a line 386 extending to the third to fourth shift valve 294. Consequently, the front unit clutch servo motor 31 will be pressure actuated and engage the front unit clutch 30.

In addition, since the third to fourth shift valve 294 is in the downshifted position, line 386 will be opened to an exhaust port 388 in the bore thereof by lands 302 and 306. This will drain control line 194, since it communicates through the bore of the second to third shift valve 262 with the line 354, whereupon spring 180 will move the hydrodynamic brake supply and exhaust valve 170 to the demonstrated position; supply valve element 172 will cut off line 202 and stop supplying fluid pressure via the hydrodynamic brake supply line 200 to the hydrodynamic brake 28 while the exhaust valve element 182 will open the hydrodynamic brake exhaust line 190 to the exhaust port 192 and drain the hydrodynamic brake 28. The engagement of the front unit clutch 30 with the intermediate clutch 64 engaged will lock up the front gear unit 14, as explained before, and cause the one-way device 38 to release so that the speed at which the hydrodynamic brake 28 is emptied in this manner is not significant or too important in the calibration.

Since the front unit clutch supply line 376 communicates with the end area of land 248 on the intermediate clutch control valve 246, the preparation of the transmission for third speed will commence as soon as the front unit clutch 30 is engaged. The fluid pressure in line 376 will move the intermediate clutch control valve 246 to the right and start to drain the intermediate clutch servo motor 66 through an exhaust port 389 in the bore of the intermediate clutch control valve 246 via line 367, the bore of the second to third shift valve 262, and line 366. The intermediate clutch accumulator 370 will also be drained through this same exhaust port 389, and the intermediate clutch 64 will be fully disengaged.

The front unit clutch supply line 376 likewise extends to the rear unit clutch control valve land area 256 and has therein a one-way orifice 390. Orifice 390 functions to delay the supply of fluid pressure to the rear unit clutch control valve 254, but moves out of the way when this line 376 upstream thereof is exhausted. After the fluid pressure reaches the rear unit clutch control valve 254 another delay occurs. This latter delay is due to the size of the rear unit clutch control valve 254, since the resultant cavity as the valve 254 moves to the right requires an increasing volume of fluid. As the cavity fills a pressure rise is delayed so that an accumulator effect results. When the pressure again builds up enough the valve 254 will be moved to the right until communication between main supply line branch 374 and a rear unit clutch supply line 392 is established. As with the intermediate clutch control valve 246, a restriction 393 is installed in the branch 374 to prevent pressure drops upstream of the restriction 393 from interfering with the maintenance of main line pressure.

A branch 394 of the rear unit clutch supply line 392 extends to the rear unit clutch accumulator 372 resulting in a simultaneous supply of fluid pressure thereto. The rear unit clutch accumulator 372 includes a piston 396, which is slidable in a bore in a suitable housing 397 and which is biased downwardly by a pair of springs 398 and 400. The rear unit clutch accumulator proportions are important, for as the fluid pressure in the rear unit clutch supply line 392 increases the piston 396 will move upwardly and the resultant space, which will be filled by fluid pressure, will slow up or retard pressure build up to the rear unit clutch servo motor 70.

The intermediate clutch accumulator 370 is preferably of structure similar to that of the rear unit clutch accumulator 372, as mentioned, with its proportions being carefully selected so that the accumulator or retarding effect from the rear unit clutch accumulator 372, the rear unit clutch control valve 254, and the one-way orifice 390, insure that the intermediate clutch 64 is disengaged before the rear unit clutch 68 is engaged. For, as previously explained, if clutches 64 and 68 are both engaged for an instant in second speed the rear gear unit 16 would be locked up for direct drive and fourth speed would be in effect for the interval both clutches were engaged.

The drive train in second speed has been described before and again it is pointed out that there is no timing problem with respect to the operativeness of the front unit clutch 30 and the hydrodynamic brake 28 except that the hydrodynamic brake 28 must be emptied before the rear unit clutch 68 is engaged.

*Shift Second to Third*

When vehicle speed increases further G-1 pressure and G-2 pressure will, accordingly, have increased and the combination of each acting, respectively, on the second to third governor plug valve land 282 and on the differential area determined by lands 272 and 274 on the shift valve proper 262 will force the second to third shift valve to the upshifted position. In this upshifted position lands 276 and 278 on the shift valve 262 will align the ports connected to the Drive Range 4 supply line 360 and the control line 194 to the hydrodynamic brake supply and exhaust valve 170. The fluid pressure supplied the control line 194 and also the branch 196 thereof will move both the supply valve element 172 and the exhaust valve element 182 to the left, as viewed, and again cause the hydrodynamic brake 28 to be filled via hydrodynamic brake feed line 200, while closing off communication between the hydrodynamic brake exhaust line 190 and exhaust port 192.

It is again pointed out here that the rate at which the hydrodynamic brake 28 is filled is controlled by the hydrodynamic brake supply rate valve 204. If the throttle opening is such that TV pressure forces the rate valve 204 to the slow feed position, then only the primary orifice 214 is effective. The filling of the brake 28 therefore will not produce a dangerous pressure drop in the system.

Since most of the second to third shift requirements were completed prior to the upshift movement of the second to third shift valve 262, the shift is very simple and the front gear unit 14 again becomes a reduction unit. The rear gear unit 16 is ineffective in third speed, the output carrier 56 being connected directly to the front unit output carrier 24.

*Shift Third to Fourth*

A still further increase in vehicle speed will cause the joint action of G-1 and G-2 pressures acting, respectively, on the differential area of the third to fourth shift valve proper 294 defined by lands 300 and 304 and on the end area of land 310 on the third to fourth governor plug valve 296 to force the third to fourth shift valve 294 to the upshifted position against the opposing bias from springs 312 and 314 and the counter force from TV pressure. As a result, a sub-branch 402 of the main supply line will be joined to line 386 by lands 302 and 306 on the third to fourth shift valve 294. Fluid pressure will now be transferred through the bore of the first to second shift valve 234, line 354, the bore of the upshifted second to third shift valve between lands 278 and 280, and the intermediate clutch supply line 367 to the intermediate clutch servo motor 66. The intermediate clutch 64 will be engaged and cause the front gear unit 14 to be locked up for direct drive along with the rear gear unit 16, in the manner previously described. The power shaft 10 and the load shaft 12 will both revolve at the same speed.

When the third to fourth shift valve 294 moves to the upshifted position the line 346, which is supplied with fluid pressure via the detent valve bore and line 344 extending from the manual valve 114, will be placed in communication with a line drop supply line 404 by lands 304 and 306. Fluid pressure in supply line 404 will then be transferred to the pressure regulator valve 100 and in acting on the differential area established by lands 328 and 330 thereon will urge the pressure regulator valve 100 in a pressure reducing direction so that main line pressure is decreased. The reason for this is that line pressure need not be as great for maintaining the various clutches and brakes engaged in fourth speed. By lowering line pressure the load on the pumps 84 and 86 is decreased with a resultant saving in power.

*Full Throttle Fourth to Third Shift*

Assuming that the vehicle is operating below some predetermined maximum speed, e.g., 35 m.p.h. it is possible to compel a shift from fourth to third by depressing the accelerator pedal to the full throttle position, but short of the detent position. As a consequence, full communication will be established by the throttle valve lands 140 and 142 between main supply line branch 128 and branch 146 to the TV pressure supply line 148, whereupon TV pressure will equal line pressure. This maximum TV pressure in acting on the third to fourth regulator plug valve 298 will be sufficient to overcome the counter forces from G-1 and G-2 pressure and move the third to fourth shift valve 294 to the downshifted position. Communication between main supply line sub-branch 402 and line 386, which transfers fluid pressure via a previously described path to the intermediate clutch supply line 367, is cut off and drained through exhaust port 388 in the third to fourth shift valve bore. The intermediate clutch 64 will disengage and third speed will be reestablished.

Also, the third to fourth shift valve 294 in returning to the downshifted position will interrupt communication between line 346 and line drop supply line 404; line 404 will be connected to the line drop supply line to exhaust port 405 to the bore of the third to fourth shift valve 294, and line pressure will increase to the maximum permitted by pressure regulator spring 336.

*Detent or Forced Fourth to Third Shift*

When the transmission is operating in fourth speed ratio above the 35 m.p.h., suggested as being the maximum speed at which a full throttle will downshift could be compelled, it is possible to still obtain a fourth to third shift up to another predetermined maximum speed, e.g. 65 m.p.h., by moving the accelerator pedal beyond the full throttle position and to the mentioned detent position. This latter movement will slide the detent valve 156 to the extreme left, as viewed, and then the line 320, which had been relieved via a Drive Range 3 supply line 406 through the exhaust port 293 in the bore of the manual valve 114, will be placed in communication by the detent valve lands 160 and 162 with line 342 extending from the manual valve bore. Fluid pressure at main line pressure will act on the entire face area of the third to fourth shift valve land 300 and force valve 294 to the downshifted position. As just explained during the description of the full throttle fourth to third shift, the third to fourth shift valve 294 in returning to the downshifted position will cause the line drop feature to be removed and the intermediate clutch 64 to be disengaged.

When the detent valve 156 is in its extreme left or detent position fluid pressure in the line 342 is also transferred between the detent valve lands 158 and 160 to a line 408 extending to the differential area on the second to third governor plug valve 264 established by lands 284 and 286 thereon. This particular function will be explained in detail in the description of a detent or forced third to second shift, it being sufficient to say here that the force acting on the second to third governor plug valve 264 from the fluid pressure in line 408 is not adequate to enforce the third to second downshift with the G-1 and G-2 pressures permitted.

*Manual Fourth to Third Shift*

A so-called manual fourth to third shift is possible below the previously suggested 65 m.p.h. maximum speed whenever the manual valve 14 is moved one step to the right, as viewed, from the Drive Range 4 setting to the Drive Range 3 setting. In the Drive Range 3 setting the manual valve land 122 will uncover the port to the Drive Range 3 supply line 406 and cause fluid pressure to be supplied thereby through the bore of the detent valve 156 and to line 320. Then, as with a detent or forced fourth to third shift, the fluid pressure in line 320, being the same as main line pressure, will act on the end area of the third to fourth shift valve 294 compelling it to move to the down shifted position.

*Drive Range 3*

As explained in the description of the manual fourth to third shift, movement of the manual valve 114 to the Drive Range 3 setting causes the land 122 to uncover the port connected to the Drive Range 3 supply line 406 and establish communication with the port joined to the main supply line branch 116. Fluid pressure, then, proceeds via line 320 to the third to fourth shift valve spring pocket 318 and prevents the third to fourth shift valve train from moving to the upshifted position until some predetermined speed is exceeded, e.g., the 65 m.p.h. speed suggested before. If movement of the manual valve 114 to the Drive Range 3 setting is made before vehicle movement is started the transmission will automatically operate sequentially, in the previously described manner, with drive progressing from the first speed to second speed ratio and finally to the third speed ratio.

In the Drive Range 3 provision is needed for overrun braking since with the load shaft 12 driving, as during vehicle coast, the reversal of drive will cause the one-way device 38 between the hydrodynamic brake 28 and the front gear unit reaction sun gear 22 to release, the sun gear 22 being driven in a forward direction. As a result, the engine is of no use as a brake. To overcome this lack of engine braking an overrun brake 410, which may be actuated in any suitable manner in Drive Range 3, is installed in the transmission so as to prevent rotation of the front unit reaction sun gear 22 in either direction. Then, when the overrun brake 410 is engaged and the load shaft 12 is driving in third speed the front unit carrier 24 will be driven through the rear unit clutch 68 at the same speed as the load shaft 12. With the reaction sun gear 22 now held against forward rotation the ring gear 20 and accordingly the power shaft 10 will desirably be overdriven so as to obtain added braking resistance from the engine.

*Detent Third to Second Shift*

Assuming that the transmission is operating in the third speed below a predetermined maximum vehicle speed and that the manual valve 114 is in either the Drive Range 4 or the Drive Range 3 setting a shift from third to second can be compelled by movement of the accelerator pedal beyond the full throttle position and to the detent position, somewhat as a detent fourth to third shift. This action, as before explained, moves the detent valve 156 to the detent position and establishes communication between line 342 and line 408 extending to the second to third governor regulator valve 264. When the detent valve 156 moves to the detent position the connection between lines 320 and 406 is interrupted by the detent valve land 162, but the fluid pressure in line 342 replaces that in the Drive Range 3 supply line 406 due to the spacing of the detent valve lands 160 and 162. The third to fourth shift valve train therefore is still held by line pressure in downshifted position.

The fluid pressure in the line 408 acts on the differential area defined by the governor plug valve lands 284 and 286 and will force the second to third shift valve train to the downshifted position. In moving to the downshifted position, communication between control line 194 to the hydrodynamic brake supply and exhaust valve 170 and the Drive Range 4 supply line 360 is stopped by land 276. But, this land 276 and land 278 then align ports to control line 194 and line 354 with the result that the fluid pressure therein is drained through the exhaust port 388 in the bore of the third to fourth shift valve 294 via the bore of the first to second shift valve 234 and line 336. With control line 194 so drained the hydrodynamic brake supply and exhaust valve 170 will, in the prior described manner, exhaust the hydrodynamic brake 28.

When the second to third shift valve 262 moved to the downshifted position the connection between the intermediate clutch supply line 367 and line 354, which is connected to the exhaust port 388 through the first to second shift valve 234, as just described, is, of course, broken, but the intermediate clutch supply line 367 is now placed in communication with line 366 by lands 278 and 280. Therefore, the intermediate clutch 64 still remains disengaged, since line 366 is now drained to exhaust port 389 through the bore of the intermediate control valve 246.

From the preceding, it can be seen that in making a third to second shift only the hydrodynamic brake 28 is rendered inoperative. The upshift back to third still requires only a refilling of the hydrodynamic brake 28.

*Manual Third to Second Shift*

Simply by moving the manual valve 114 from the

Drive Range 3 setting to the Low Range setting a shift from third to second speed can be enforced, assuming again that vehicle speed is below the predetermined maximum that enables such a downshift. When the manual valve 114 is moved to the Low Range setting the land 12 thereon uncovers the port connected to Low Range supply line 292, whereupon fluid pressure is transferred from the main supply line branch 116 to the second to third shift valve spring pocket 290. As with the third to fourth shift valve train, this pressure, being equivalent to main line or pump output pressure, acts on the large end area of land 272 and will force the second to third shift valve 262 to the downshifted position. The porting and the various lines then will be connected as with the detent third to second shift; the hydrodynamic brake 28 emptied and second speed established.

Low Range Operation

For Low Range the manual valve 114 is moved to the Low Range setting, and as explained relative to the manual third to second shift, supply of fluid pressure via the Low Range supply line 292 to the second to third shift valve spring pocket 290 will either force the second to third shift valve 262 to the downshifted position or maintain it in this position, provided the speed of the vehicle is below a predetermined maximum. If the transmission should be operating in fourth speed after the manual valve 114 is moved to the Low Range setting it will continue in fourth speed until the vehicle speed drops below this predetermined maximum that permits second speed operation, when the transmission will be compelled to downshift to second speed. If vehicle speed exceeds the predetermined maximum speed in second speed the combined action of G-1 and G-2 governor pressures will then force the second to third shift valve 262 to the upshifted position.

With the second to third shift valve 262 maintained in the downshifted position, the transitions from first to second speed ratios will occur in the way described. If a downshift is compelled to second speed this will occur as explained under the heading "Manual Third to Second Shift."

Reverse

To condition the transmission for a reverse drive, the manual valve 114 is moved to the right one step beyond the Low Range setting and to the Reverse setting. In this setting the manual valve land 118 will interrupt communication between branch 382 of the reverse supply line 380 and exhaust port 363 and the manual valve land 120 will have moved beyond the main supply line branch 116. Hence, fluid pressure from branch 116 supplied by the reverse supply line 380 to the reverse brake servo motor 78 will engage the reverse brake 76.

A branch 412 of the reverse brake supply line 380 extends to the rear unit brake valve 218, so that fluid pressure therein will act on the end area of the plug valve part 222 and force the rear unit brake valve 218 to the right. In this new position brake valve land 228 will interrupt fluid flow between main supply line branch 348 and the rear unit brake supply line 350, whereas brake valve land 230 will establish communication between the rear unit supply line 350 and an exhaust port 414, as a consequence, the rear unit brake 60 is disengaged. Also, when the reverse brake supply line 380 is furnished fluid pressure this pressure will be transferred by line 380 to the right end of the pressure regulator valve 100 and will act on the plug 338, the result being that pump output from the main line pressure is increased substantially. This additional pressure insures that the reverse brake 76 remains engaged thereby enabling the brake 76 to withstand a considerable reaction torque load in the Reverse Drive Range.

In Reverse the hydrodynamic brake 28 is filled in the same manner as when the transmission is prepared for Neutral, i.e., line pressure is supplied by the main supply line branch 352 in sequence through the first to second shift valve 234, line 354, the bore of the second to third shift valve 262, and to the control line 194 so as to move the hydrodynamic brake supply and exhaust valve 170 to the hydrodynamic brake fill position. The intermediate clutch 64 is engaged when the rear unit brake valve 228 moves to the position it assumes when exhausting the rear unit brake servo motor 62. In this latter position the lands 224 and 226 connect the port joined to the main supply line 94 and the port in communication with line 365 extending to the intermediate clutch control valve 246. Therefore, fluid pressure is transferred through the intermediate clutch control valve bore 246, the valve being in the depicted position, through line 366, between lands 278 and 280 of the second to third shift valve 262, and then to the intermediate clutch supply line 367, activating the intermediate clutch servo motor 66 and engaging the intermediate clutch 64.

With the reverse brake 76 and the intermediate clutch 64 engaged and the hydrodynamic brake 28 operative the reverse drive train is, as has been explained before, through the front gear unit 14 at a reduced speed in a forward direction and to the rear gear unit sun gear 52. The resultant backward rotation of the rear unit ring gear 50 revolves the reverse unit sun gear 72 likewise backwards, which, in turn, drives the reverse unit carrier 82, and accordingly, the load shaft 12 in a reverse direction at a reduced speed.

Closed Throttle Downshifts

When the vehicle is being brought to rest downshifts will occur in the reverse order of the upshifts, but at points different from the upshifts. In other words, if an upshift occurred at 15 m.p.h., a normal downshift would occur at a lesser speed, e.g., 10 or 12 m.p.h. One reason for this is that TV pressure is at a minimum when the throttle is closed. Another reason is that there is a difference in the size of the lands on the shift valves and this difference determines the shift points. For instance, it will be noted that the land 306 on the third to fourth shift valve 294 has a larger diameter than the adjacent land 302. The differential will, when the fluid pressure in the line 402 passes between these lands and to the line 386, result in a greater force being exerted on the larger land 306 because of the greater exposed surface. This produces a tendency for the third to fourth shift valve 294 to remain in the upshifted position. Governor pressure acting on this valve train must therefore decrease to a lower value than otherwise would be necessary to move the valve train to the upshifted position with equivalent TV pressure.

Also, this aspect exists with the second to third shift valve 262, the land 276 having a larger diameter than the land 278, and as a result, the fluid pressure in the line 360, being transferred to the control line 194, will exert a greater force in the upshifted direction.

These differential areas create what is termed in the art as "hysteresis effects" and vary the points at which downshifts and upshifts occur under similar conditions.

Exhaust of System

After the vehicle is brought to rest, the engine stopped, and the manual valve 114 placed in either the Neutral or Park settings the system is exhausted as follows. The front unit clutch servo motor 31 is drained through the exhaust port 378 in the bore of the first to second shift valve 234 by way of line 376. The pressure in control line 194 will fall due to leakage both in the system and that permitted through the pumps to sump. Consequently, the hydrodynamic brake supply and exhaust valve 170 will move to the demonstrated position in which the exhaust valve element 182 aligns the exhaust port 192 with the port for the hydrodynamic brake exhaust line 190, and the hydrodynamic brake 28 then will be relieved of pressure fluid. The exhaust port 293 in the bore of the manual valve 114 will, through the Drive Range 4 supply line 260, line 364, the bore of the rear unit brake valve 218, line 365, and the bore of the intermediate clutch valve 246, be placed in communication with the line 366, which, in turn, communicates with the intermediate clutch supply line 367 through the bore of the second to third shift valve 262; hence, the intermediate clutch servo motor 66 is deactivated and the intermediate clutch 64 is disengaged. Because the pumps 84 and 86 no longer maintain pressure in the rear unit brake servo motor 62, the rear unit brake 60 will be disengaged, the rear unit brake supply line 350 being drained by the connection established through branch 348 in the bore of the rear unit brake valve 218, the main supply line 94, and through the pumps to sump 93. As has been mentioned, the reverse unit brake supply line 380 with the manual valve 114 in any of the several settings other than Reverse is in communication via branch 382 with exhaust port 363 in the manual valve bore and therefore, will drain the reverse unit brake servo motor 78 insuring that the reverse brake 76 is disengaged. In this manner all of the ratio establishing devices, which determine the torque trains and the ratios through the transmission, are all rendered inoperative and drive through the transmission in either direction is no longer possible.

I claim:

1. In a hydrodynamic brake, the combination of a rotor driven by source or torque and a stator coacting to define a fluid working circuit, means movable relative to the circuit and so arranged as to vary the resistant capacity of the brake, a source of fluid under pressure, and means responsive to torque demand for supplying the working circuit with fluid from the source at variable flow rates, and means for at times emptying said brake.

2. In a hydrodynamic brake, the combination of a rotor driven by a source of torque and a stator both being provided with vanes and coacting to define a fluid working circuit, a fluid deflecting member arranged for movement into the working circuit so as to vary the resistant capacity of the brake, speed responsive means for controlling movement of the fluid deflecting member, a source of fluid under pressure, and means responsive to torque demand for supplying the working circuit with fluid from the source at variable flow rates, and means for at times emptying said brake.

3. In a hydrodynamic brake for an engine driven member, the combination of a rotor revolvable with the driven member and a stator both being provided with vanes and coacting to define a fluid working circuit, a vane arranged for movement into and out of the working circuit, biasing means for urging the vane into the working circuit so as both to reduce the resistant capacity of the brake and to increase the stall speed, speed responsive means for urging the vane from the working circuit, a source of fluid under pressure, and supply means furnishing the brake working circuit with fluid under pressure from the source, the supply means including a valve responsive to torque demand on the engine for varying the rate at which fluid is supplied from the source to the brake in accordance with engine torque demand, and means for at times emptying said brake.

4. In a hydrodynamic brake for an engine driven member, the combination of a rotor revolvable with the driven member and a stator both being provided with vanes and coacting to define a fluid working circuit, a vane arranged for movement into and out of the working circuit of the stator, a servo motor adjacent the stator and including a piston slidable therein and joined to the vane, a spring acting on the piston and urging the vane into the working circuit so as both to reduce the resistant capacity of the brake at relatively slow speeds and to increase the stall speed thereof, a source of speed response fluid pressure communicating with the servo motor and acting on the piston so as to urge the vane from the working circuit, a source of fluid under pressure, and supply means furnishing the brake working circuit with fluid under pressure from the source, the supply means including a valve responsive to torque demand on the engine for varying the rate at which fluid is supplied from the source to the brake in accordance with the engine torque demand, and means for at times emptying said brake.

5. In combination, a planetary gear unit comprising input, output, and reaction elements, the input being drive connected to a saurce of torque, a hydrodynamic brake for resisting rotation of the reaction element so as to condition the gear unit for transfer of drive between the input and output elements, means for varying the resistant capacity of the brake, a source of fluid under pressure, and means responsive to torque demand for supplying the working circuit with fluid from the source at variable flow rates, and means for at times emptying said brake.

6. In combination, a planetary gear unit comprising input, output, and reaction elements, the input being connected to a source of torque, a hydrodynamic brake for resisting rotation of the reaction element so as to condition the gear unit for transfer of drive between the input and output, the hydrodynamic brake including a stator and a rotor, the rotor being connectible with the reaction element, both the stator and the rotor being provided with vanes and coacting to define a fluid working circuit, means movable into the circuit and so arranged as to vary the resistant capacity of the brake, means for controlling movement of the movable means, a source of fluid under pressure, and means responsive to torque demand supplying the working circuit with fluid from the source at variable flow rates and means for at times emptying said brake.

7. In an engine driven transmission; the combination of a planetary gear unit comprising input, output, and reaction elements, a hydrodynamic brake for resisting rotation of the reaction element so as to condition the gear unit for transfer of drive between the input and output elements, the hydrodynamic brake including a stator and a rotor, the rotor being connectible with the reaction element, both the stator and rotor being provided with vanes and coacting to define a fluid working circuit, a fluid deflecting member arranged for movement into the working circuit so as to vary the resistant capacity of the brake, speed responsive means for controlling movement of the fluid deflecting member, a source of fluid under pressure, and supply means furnishing the brake working circuit with fluid under pressure from the source, the supply means including a valve responsive to torque demand on the engine for varying the rate at which fluid is supplied from the source to the brake in accordance with the engine torque demand, and means for at times emptying said brake.

8. In an engine driven transmission; the combination of a planetary gear unit comprising an input gear, a reaction gear, and an output planet carrier provided with a plurality of planet pinions journaled thereon so as to intermesh with the input and reaction gears; clutch means so arranged as to afford a direct drive ratio through the gear unit; and a hydrodynamic brake for resisting rotation of the reaction gear in one direction thereby furnishing another drive ratio through the gear unit, the hydrodynamic brake including a stator and a rotor, the rotor having a one-way drive connection with the reaction gear, both the stator and the rotor being provided with vanes and coacting to define a fluid working circuit, a vane arranged for movement into and out of the working circuit of the stator, a servo motor adjacent the stator and including a piston slidable therein and joined to the vane, a spring acting on the piston and uring the vane into the working circuit so as both to reduce the resistant capacity of the brake at relatively slow speeds and to increase the stall speed thereof, a source of speed responsive fluid pressure communicating with the servo motor and acting on the piston so as to urge the vane from the working circuit as the speed of the driven planet carrier increases, a source of fluid under pressure, and supply means furnishing the brake working circuit with fluid under pressure from the source, the supply means including a valve responsive to torque demand on the engine for varying the rate at which fluid is supplied from the source to the brake in accordance with the engine torque demand, and means for at times emptying said brake.

9. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, brake means for preventing rotation of each gear unit reaction element in one direction so as to afford one drive ratio through the respective gear units, an intermediate clutch operative to drive connect the first gear unit output element and the second gear unit input element, a first gear unit clutch operative to join the driving member and the input element of the second gear unit so as to provide in conjunction with said intermediate clutch another drive ratio through the first gear unit, and a second gear unit clutch operative to join the first and second gear unit output elements so as to furnish another drive ratio through the second gear unit, the intermediate clutch being inoperative so as to permit the brake means to be effective in the neutral condition of the transmission.

10. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a brake for preventing rotation of the second gear unit reaction element in one direction so as to condition the second gear unit for one drive ratio, a hydrodynamic brake for resisting rotation of the first gear unit reaction element in one direction so as to condition the first gear unit for one drive ratio therethrough, means for varying the resistant capacity of the hydrodynamic brake, an intermediate clutch operative to drive connect the first gear unit output element, and the second gear unit input element, a first gear unit clutch operative to join the driving member and the input element of the second gear unit so as to provide in conjunction with said intermediate clutch another drive ratio through the first gear unit, and a second gear unit clutch operative to join the first and second gear unit output elements so as to furnish another drive ratio through the second gear unit.

11. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a brake for preventing rotation of the second gear unit reaction element in one direction so as to condition the second gear unit for one drive ratio, a hydrodynamic brake for resisting rotation of the first gear unit reaction element in one direction so as to condition the first gear unit for one drive ratio therethrough, the hydrodynamic brake including a stator and a rotor, the rotor being connectible with the reaction element of the first gear unit, both the stator and the rotor being provided with vanes and coacting to define a fluid working circuit, a vane arranged for movement into and out of the working circuit, biasing means for urging the vane into the working circuit so as to reduce the resistant capacity of the brake and to increase the stall speed thereof, means responsive to the speed of one of the members for urging the vane out of the working circuit, an intermediate clutch operative to drive connect the first gear unit output element and the second gear unit input element, a first gear unit clutch operative to join the driving member and the input element of the second gear unit so as to provide in conjunction with said intermediate clutch another drive ratio through the first gear unit, and a second gear unit clutch operative to join the first and second gear unit output elements so as to furnish another drive ratio through the second gear unit.

12. In a transmission, the combination of driving and driven members, planetary gearing interposed between the driving and driven members and comprising first and second gear units each including input, output, and reaction elements, the first gear unit having the input element thereof rotatable by the driving member, the second gear unit having the output element thereof rotatable with the driven member, a plurality of ratio establishing devices operative to render the gear units effective so as to provide a plurality of drive ratios through the transmission, one of the drive ratio changes requiring a reconditioning of both gear units, the ratio establishing devices including a brake for resisting rotation of one of the gear unit reaction elements in one direction so as to condition said one of the gear units for one drive ratio, and means causing the operation of the ratio establishing devices to be so correlated that during said one drive ratio change requiring a reconditioning of both gear units the ratio establishing devices for producing said one drive ratio change are rendered effective prior to said one drive ratio change while the brake is rendered ineffective and at the time of said one ratio change only the brake is rendered effective.

13. In a transmission, the combination of driving and driven members, planetary gearing interposed between the driving and driven members and comprising first and second gear units each including input, output, and reaction elements, the first gear unit having the input element thereof rotatable by the driving member, the second gear unit having the output element thereof rotatable with the driven member, a plurality of ratio establishing devices operative to render the gear units effective so as to provide a plurality of drive ratios through the transmission, one of the drive ratio changes requiring a reconditioning of both gear units, the ratio establishing devices including a hydrodynamic brake for resisting rotation of one of the gear unit reaction elements in one direction so as to condition said one of the gear units for one drive ratio, and means causing the operation of the ratio establishing devices to be so correlated that during said one drive ratio change requiring a reconditioning of both gear units the ratio establishing devices for producing said one drive ratio change are rendered effective prior to said one drive ratio change and at the time of said one ratio change only the hydrodynamic brake is rendered effective.

14. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, first and second gear unit brakes operative to resist rotation of the respective gear unit reaction elements in one direction so as to provide one drive ratio through the gear unit, first and second gear unit clutches operative to condition the respective gear units for another drive ratio, and an intermediate clutch operative to interconnect the first gear unit output element and the second gear unit input element, one of the drive ratio changes requiring a reconditioning of both gear units, the operation of the clutches and brakes being so correlated that during said one drive ratio change requiring a reconditioning of both gear units the intermediate clutch and the first gear unit brake are rendered inoperative and the second gear unit clutch operative prior to said one drive ratio change and at the time of said one drive ratio change only the first gear unit brake is again rendered operative so as to complete the ratio change.

15. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, a second gear unit brake operative to prevent rotation of the second gear unit reaction element in one direction so as to provide one drive ratio through the second gear unit, first and second gear unit clutches operative to condition the respective gear units for another drive ratio, and an intermediate clutch operative to interconnect the first gear unit output element and the second gear unit input element, one of the drive ratio changes requiring a reconditioning of both gear units, the operation of the clutches and brakes being so correlated that during said one drive ratio change requiring a reconditioning of both gear units the intermediate clutch and the hydrodynamic brake are rendered inoperative and the second gear unit clutch operative prior to said one drive ratio change and at the time of said one drive ratio change only the hydrodynamic brake is again rendered operative so as to complete the ratio change.

16. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, means for varying the resistant capacity of the hydrodynamic brake, a second gear unit brake operative to prevent rotation of the second gear unit reaction element in one direction so as to provide one drive ratio through the second gear unit, first and second gear unit clutches operative to condition the respective gear units for another drive ratio, and an intermediate clutch operative to interconnect the first gear unit output element and the second gear unit input element, one of the drive ratio changes requiring a reconditioning of both gear units, the operation of the clutches and brakes being so correlated that during said one drive and ratio change requiring a reconditioning of both gear units the intermediate clutch and the hydrodynamic brake are rendered inoperative and the second gear unit clutch operative prior to said one drive ratio change and at the time of said one drive ratio change only the hydrodynamic brake is again rendered operative so as to complete the ratio change.

17. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, the hydrodynamic brake including a stator and a rotor, the rotor having a one-way connection with the reaction element of the first gear unit, both the stator and the rotor being provided with vanes and coacting to define a fluid working circuit, a vane arranged for movement into and out of the working circuit, biasing means for urging the vane into the working circuit so as to reduce the resistant capacity of the brake and to increase the stall speed thereof, means responsive to speed of one of the members for urging the vane out of the working circuit, a second gear unit brake operative to prevent rotation of the second gear unit reaction element in one direction so as to provide one drive ratio through the second gear unit, first and second gear unit clutches operative to condition the respective gear units for another drive ratio, and an intermediate clutch operative to interconnect the first gear unit output element and the second gear unit input element, one of the drive ratios requiring a reconditioning of both gear units, the operation of the clutches and brakes being so correlated that during said one drive ratio change requiring a reconditioning of both gear units the intermediate clutch and the hydrodynamic brake are rendered inoperative and the second gear unit clutch operative prior to said one drive ratio change and at the time of said one drive ratio change only the hydrodynamic brake is again rendered operative so as to complete the ratio change.

18. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, means for varying the resistant capacity of the hydrodynamic brake, a second gear unit brake operative to prevent rotation of the second gear unit reaction element in one direction so as to provide one drive ratio through the second gear unit, first and second gear unit clutches operative to condition the respective gear units for another drive ratio, an intermediate clutch operative to interconnect the first gear unit output element and the second gear unit input element, and a reaction mass connectible with the first gear unit reaction element for rotation therewith, the first gear unit clutch, when operative, causing both the first gear unit reaction element and the reaction mass to be accelerated and the speed of both the driving member and the first gear unit input element to be altered so as to be in a predetermined proportion to the speed of the first gear unit reaction element and thereby cause the inertias of the reaction mass and the first gear unit reaction element to be balanced by the inertias of the driving member and the first gear unit input element, one of the drive ratio changes requiring a reconditioning of both gear units, the operation of the clutches and brakes being so correlated that during said one drive ratio change requiring a reconditioning of both gear units the intermediate clutch and the hydrodynamic brake are rendered inoperative and the second gear unit clutch operative prior to said one drive ratio change and at the time of said one drive ratio change only the hydrodynamic brake is again rendered operative so as to complete the ratio change.

19. In a transmission, the combination of driving and driven members, planetary gearing interposed between the driving and driven members for providing a pluarlity of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, the hydrodynamic brake including a stator and a rotor, the rotor having a one-way connection with the reaction element of the first gear unit, both the stator and the rotor being provided with vanes and coacting to define a fluid working circuit, a vane arranged for movement into and out of the working circuit, biasing means for urging the vane into the working circuit so as to reduce the resistant capacity of the brake and to increase the stall speed thereof, means responsive to speed of one of the members for urging the vane out of the working circuit, a second gear unit brake operative to prevent rotation of the second gear unit reaction element in one direction so as to provide one drive ratio through the second gear unit, first and second gear unit clutches operative to condition the respective gear units for another drive ratio, an intermediate clutch operative to interconnect the first gear unit output element and the second gear unit input element, and a reaction mass connectible with the first gear unit reaction element for rotation therewith, the first gear unit clutch, when operative, causing both the first gear unit reaction element and the reaction mass to be accelerated and the speed of both the driving member and the first gear unit input element to be altered so as to be in a predetermined proportion to the speed of the first gear unit reaction element and thereby cause the inertias of the reaction mass and the first gear unit reaction element to be balanced by the inertias of the driving member and the first gear unit input element, one of the drive ratios requiring a reconditioning of both gear units, the operation of the clutches and brakes being so correlated that during said one drive ratio change requiring a reconditioning of both gear units the intermediate clutch and the hydrodynamic brake are rendered inoperative and the second gear unit clutch operative prior to said one drive ratio change and at the time of said one drive ratio change only the hydrodynamic brake is again rendered operative so as to complete the ratio change.

20. In a transmission, the combination of driving and driven members, planetary gearing interposed between the driving and driven members for providing a plurality of drive ratios therebetween, the planetary gearing comprising first and second gear units each including an input gear, a reaction gear, and an output planet carrier with a plurality of planet pinions journaled thereon so as to intermesh with the input and reaction gears, the first gear unit having the input gear rotatable by the driving member, the second gear unit having the output carrier rotatable with the driven member, a hydrodynamic brake operative to resist rotation of the first gear unit reaction gear in one direction so as to provide one drive ratio through the first gear unit, the hydrodynamic brake including a stator and a rotor, the rotor having a one-way connection with the reaction gear of the first gear unit, both the stator and the rotor being provided with vanes and coacting to define a fluid working circuit, a vane arranged for movement into and out of the working circuit, biasing means for urging the vane into the working circuit so as to reduce the resistant capacity of the brake and to increase the stall speed thereof, means responsive to speed of one of the members for urging the vane out of the working circuit, a second gear unit brake operative to prevent rotation of the second gear unit reaction gear in one direction so as to provide one drive ratio through the second gear unit, first and second gear unit clutches operative to condition the respective gear units for another drive ratio, an intermediate clutch operative to interconnect the first gear unit output carrier and the second gear unit input gear, and a reaction mass connectible with the first gear unit reaction gear for rotation therewith, the first gear unit clutch, when operative, causing both the first gear unit reaction gear and the reaction mass to be accelerated and the speed of both the driving member and the first gear unit input gear to be altered so as to be in a predetermined proportion to the speed of the first gear unit reaction gear and thereby cause the inertias of the first gear unit reaction gear and the reaction mass to be balanced by the inertias of the driving member and the first gear unit input gear, one of the drive ratios requiring a reconditioning of both gear units, the operation of the clutches and brakes being so correlated that during said one drive ratio change requiring a reconditioning of both gear units the intermediate clutch and the hydrodynamic brake are rendered inoperative and the second gear unit clutch operative prior to said one drive ratio change and at the time of said one drive ratio change only the hydrodynamic brake is again rendered operative so as to complete the ratio change.

21. In an engine driven transmission, the combination of a hydrodynamic brake including a rotor revolvable with a transmission output shaft and a stator coacting to define a fluid working circuit, means movable into the circuit and so arranged as to vary the resistant capacity of the brake, a source of fluid under presure, and supply means for furnishing the working circuit with fluid under pressure, the supply means including means responsive to torque demand on the engine for causing fluid to be furnished from the source at variable flow rates, and a relay valve for connecting the brake to the source in one ratio and for disconnecting the brake from the source in another ratio, and means for at times emptying said brake.

22. In a hydrodynamic brake for an engine driven member, the combination of a rotor revolvable with the driven member and a stator coacting to define a fluid working circuit, means movable relative to the circuit and so arranged as to vary the resistant capacity of the brake, a source of fluid under pressure, and supply means for furnishing the brake working circuit with fluid under pressure from the source, the supply means including a valve responsive to torque demand on the engine for varying the flow rate at which fluid is supplied from the source to the brake in accordance with the engine torque demand, and means for at times emptying said brake.

23. In a hydrodynamic brake for an engine driven member, the combination of a rotor revolvable with the driven member and a stator coacting to define a fluid working circuit, means movable relative to the circuit and so arranged as to vary the resistant capacity of the brake, a source of fluid under pressure, a line joining the source and the working circuit, the line including a pair of different size orifices therein, and a valve responsive to torque demand on the engine for controlling the flow of fluid pressure through the orifices so as to vary the flow rate at which the working circuit is supplied in accordance with the engine torque demand, and means for at times emptying said brake.

24. In a hydrodynamic brake for an engine driven member, the combination of a rotor revolvable with the driven member and a stator, both being provided with vanes and coacting to define a fluid working circuit, a vane arranged for movement into and out of the working circuit of the stator, a servo motor adjacent the stator and including a piston slidable therein and joined to the vane, a spring acting on the piston and urging the vane into the working circuit so as to reduce the resistant capacity of the brake at relatively slow speeds and to increase the stall speed thereof, a source of fluid pressure, governor means interposed between the source and the servo motor for regulating the pressure of fluid from the source in proportion to the speed of the rotor so as to cause the piston and the vane to be moved in accordance therewith, a line joining the source and the working circuit, the line including a pair of different size orifices, a valve responsive to the torque demand on the engine for controlling the flow of fluid pressure through the orifices so as to vary the rate at which the brake working circuit is supplied in accordance with the engine torque demand, and means for at times emptying said brake.

25. In a transmission for a throttle controlled engine, the combination of driving and driven members, ratio changing mechanism for so conditioning the transmission as to provide a plurality of drive ratios therethrough, the ratio changing mechanism including a hydrodynamic brake, means for varying the resistant capacity of the brake, a source of fluid under pressure, and a valve for controlling, in accordance with throttle position, the flow rate at which the brake is supplied with fluid, and means for at times emptying said brake.

26. In a transmission for a throttle controlled engine, the combination of a planetary gear unit comprising an engine driven input element, an output element, and a reaction element, a hydrodynamic brake for resisting rotation of the reaction element so as to condition the gear unit for transfer of drive between the input and output elements, the hydrodynamic brake including a stator and a rotor, the rotor being connectible with the reaction element, both the stator and the rotor being provided with vanes and coacting to define a fluid working circuit, fluid pressure responsive means movable into the circuit and so arranged as to vary the resistant capacity of the brake, a source of fluid under pressure, a valve for controlling, in accordance with throttle position, the flow rate at which the brake is supplied with fluid from the source, and governor means between the source and the fluid pressure responsive means for regulating the pressure of fluid supplied thereto in proportion to the speed of the output element so as to control the movement thereof, and means for at times emptying said brake.

27. In a transmission for a throttle controlled engine, the combination of a planetary gear unit comprising an engine driven input element, an output element, and a reaction element, a hydrodynamic brake for resisting rotation of the reaction element so as to condition the gear unit for transfer of drive between the input and output elements at one ratio, the hydrodynamic brake including a stator and a rotor, the rotor having a one-way drive connection with the reaction element, both the stator and the rotor being provided with vanes and coacting to define a fluid working circuit, a vane arranged for movement into and out of the working circuit, a servo motor adjacent the stator and including a piston slidable therein and joined to the vane, biasing means acting on the piston and urging the vane into the working circuit so as both to reduce the resistant capacity of the brake and to increase the stall speed thereof, clutch means for locking up the gear unit for drive in another ratio, a source of fluid under pressure, a governor valve between the source and the servo motor for regulating the pressure of the fluid supplied thereto in proportion to the speed of the output element so as to act on the piston and urge the vane out of the working circuit, and a valve for controlling, in accordance with throttle position, the flow rate at which the working circuit is supplied with fluid from the source, and means for at times emptying said brake.

28. In a transmission, the combination of driving and driven members, gearing interposed between the driving and driven members, a plurality of ratio changing devices operative for so conditioning the gearing as to provide a series of drive ratios therethrough, shift valve means for causing the devices to establish different drive ratios and control valve means rendered effective when the shift valve means establishes one drive ratio so as to cause one ratio changing device to become inoperative and another operative and thereby prepare the gearing in advance for a change to another drive ratio.

29. In a transmission, the combination of driving and driven members, gearing interposed between the driving and driven members, a plurality of ratio changing devices operative for so conditioning the gearing as to provide a series of drive ratios therethrough, shift valve means for causing the devices to establish different drive ratios, control valve means rendered effective when the shift valve means establishes one drive ratio so as to cause one ratio changing device to become inoperative and another operative and thereby prepare the gearing in advance for a change to another drive ratio, and timing means for causing said one ratio changing device to become inoperative prior to said another device becoming operative.

30. In a transmission, the combinaiton of driving and driven members, planetary gearing interposed between the driving and driven members and including first and second gear units each having input, output, and reaction elements, the first gear unit having the input element thereof rotatable by the driving member, the second gear unit having the output element thereof rotatable with the driven member, a plurality of ratio changing devices for conditioning the respective gear units for different drive ratios, shift valve means for causing the ratio changing devices to establish the different drive ratios, and control valve means rendered effective when the shift valve means establishes one drive ratio so as to cause the ratio changing devices to condition the gear units for another ratio change in advance so that the status of only one of the devices for one of the gear units need be altered when said another ratio change is made.

31. In a transmission, the combination of driving and driven members, planetary gearing interposed between the driving and driven members for providing a plurality of drive ratios therethrough, the planetary gearing comprising first and second gear units each including input, output, and reaction elements, the first gear unit having the input element thereof rotatable by the driving member, the second gear unit having the output element thereof rotatable with the driven member, first and second gear unit brakes operative to resist rotation of the respective gear unit reaction elements in one direction so as to provide one drive ratio through each gear unit, first and second gear unit clutches operative to condition the respective gear units for another drive ratio, an intermediate clutch operative to interconnect the first gear unit output element and the second gear unit input element, shift valve means for effecting ratio changes through the transmission, the shift valve means during one ratio change causing the first gear unit clutch to become operative and the first gear unit brake inoperative while the second gear unit brake and clutch, respectively, remain operative and inoperative and the intermediate clutch remains operative, and control valve means rendered effective, when the shift valve means effects said one ratio change to cause the intermediate clutch to become inoperative and the rear gear unit clutch to become operative so as to prepare the rear gear unit in advance for another ratio change, said ratio change being completed by the shift valve means when the first gear unit brake is again made operative.

32. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, a second gear unit brake operative to prevent rotation of the second gear unit reaction element in one direction so as to provide one drive ratio through the second gear unit, first and second gear unit clutches fluid operated so as to condition the respective gear units for another drive ratio, an intermediate clutch fluid operated so as to interconnect the first gear unit output element and the second gear unit input element, a source of fluid pressure, a series of shift valves, one of the shift valves being movable to an upshifted position and arranged so as to cause fluid pressure to be supplied by the source to operate the first gear unit clutch and to cause the hydrodynamic brake to be relieved of fluid pressure, and control valve means rendered effective, when said one shift valve is in the upshifted position, by fluid pressure delivered to the first gear unit clutch to cause both the intermediate clutch to be relieved of fluid pressure so as to become inoperative and the rear gear unit clutch to be supplied fluid pressure so as to become operative thereby preparing in advance the planetary gearing for another ratio change, another one of the shift valves being movable to an upshifted position so as to cause fluid pressure to again be delivered to operate the hydrodynamic brake thereby completing said another ratio change.

33. In a transmission, the combination of driving and driven members, planetary gears interposed between the driving and driven members for providing a plurality of drive ratios therebetween, the planetary gearing comprising first and second gear units each including an input gear, a reaction gear, and an output planet carrier having a plurality of planet pinions journaled thereon and intermeshing with the input and reaction gears, the first gear unit having the input gear rotatable by the driving member, the second gear unit having the output carrier rotatable with the driven member, a hydrodynamic brake operative to resist rotation of the first gear unit reaction gear in one direction so as to provide one drive ratio through the first gear unit, a second gear unit brake operative to prevent rotation of the second gear unit reaction gear in one direction so as to provide one drive ratio through the second gear unit, first and second gear unit clutches fluid operated so as to condition the respective gear units for another drive ratio, an intermediate clutch fluid operated so as to interconnect the first gear unit output carrier and the second gear unit input gear, a source of fluid pressure, a series of shift valves, one of the shift valves being movable to an upshifted position and arranged so as to cause fluid pressure to be supplied from the source to operate the first gear unit clutch and to cause the hydrodynamic brake to be relieved of fluid pressure, control valve means rendered effective when said one shift valve is in the upshifted position by fluid pressure delivered to the first gear unit clutch to cause both the intermediate clutch to be relieved of fluid pressure so as to become inoperative and the rear gear unit clutch to be supplied fluid pressure so as to become operative thereby preparing in advance the planetary gearing for another ratio change, and timing means coacting with the control valve means so as to cause the intermediate clutch to become inoperative before the rear gear unit clutch becomes operative, another one of the shift valves being movable to an upshifted position so as to cause fluid pressure to again be delivered to operate the hydrodynamic brake thereby completing said another ratio change.

34. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, a second gear unit brake operative to prevent rotation of the second gear unit reaction element in one direction so as to provide one drive ratio through the second gear unit, first and second gear unit clutches fluid pressure operated and so arranged as to condition the respective gear units for another drive ratio, an intermediate clutch fluid pressure operated so as to interconnect the first gear unit output element and the second gear unit input element, a source of fluid pressure, a series of shift valves for operating the clutches and brakes so as to produce ratio changes, one of the shift valves being movable to an upshifted position for producing a ratio change thereby causing fluid pressure to be supplied by the source to operate the first gear unit clutch and the hydrodynamic brake to be relieved of fluid pressure, an intermediate clutch control valve and a second gear unit clutch control valve, both rendered effective, when said one shift valve is in the upshifted position, by fluid pressure delivered to the first gear unit clutch to cause, respectively, the intermediate clutch to be relieved of fluid pressure and become inoperative and the second gear unit clutch to be supplied fluid pressure so as to become operative thereby preparing in advance the planetary gearing for another ratio change, and accumulator means coacting with the intermediate clutch control valve and the second gear unit clutch control valve so as to cause the intermediate clutch to become inoperative before the second gear unit clutch becomes operative, another one of the shift valves being movable to an upshifted position so as to cause fluid pressure to again be delivered to operate the hydrodynamic brake thereby completing said another ratio change.

35. In a transmission, the combination of driving and driven members, planetary gearing interposed between the driving and driven members for providing a plurality of drive ratios therebetween, the planetary gearing comprising first and second gear units each including input, output, and reaction elements, the first gear unit having the input element thereof rotatable by the driving member, the second gear unit having the output element thereof rotatable with the driven member, a hydrodynamic brake operative to resist rotation of the first gear unit reaction element in one direction so as to provide one drive ratio through the first gear unit, the hydrodynamic brake including a stator and a rotor, the rotor having a one-way connection with the reaction element of the first gear unit, both the stator and the rotor being provided with vanes and coacting to define a fluid working circuit, a vane arranged for movement into and out of the working circuit, biasing means for urging the vane into the working circuit so as to reduce the resistant capacity of the brake and to increase the stall speed thereof, fluid pressure means responsive to the speed of one of the members for urging the vane out of the working circuit, a second gear unit brake operative to prevent rotation of the second gear unit reaction element in one direction so as to provide one drive ratio through the second gear unit, first and second gear unit clutches fluid pressure operated and so arranged as to condition the respective gear units for another drive ratio, an intermediate clutch fluid pressure operated so as to interconnect the first gear unit output element and the second gear unit input element, a source of fluid pressure, a series of shift valves for operating the clutches and brakes so as to produce ratio changes, one of the shift valves being movable to an upshifted position for producing a ratio change thereby causing fluid pressure to be supplied by the source to operate the first gear unit clutch and the hydrodynamic brake to be relieved of fluid pressure, an intermediate clutch control valve and a second gear unit clutch control valve both rendered effective, when said one shift valve is in the upshifted position, by fluid pressure delivered to the first gear unit clutch to cause, respectively, the intermediate clutch to be relieved of fluid pressure and become inoperative and the second gear unit clutch to be supplied fluid pressure so as to become operative thereby preparing in advance the planetary gearing for another ratio change, and accumulator means coacting with the intermediate clutch and the second gear unit clutch control valve so as to cause the intermediate clutch to become inoperative before the second gear unit clutch becomes operative, another one of the shift valves being movable to an upshifted position so as to cause fluid pressure to again be delivered to operate the hydrodynamic brake thereby completing said another ratio change.

36. In a transmission, the combination of driving and driven members, planetary gearing interposed between the driving and driven members for providing a plurality of drive ratios therebetween, the planetary gearing comprising first and second gear units each including an input gear, a reaction gear, and an output planet carrier having a plurality of planet pinions journaled thereon and intermeshing with the input and reaction gears, the first gear unit having the input gear thereof rotatable by the driving member, the second gear unit having the output carrier thereof rotatable with the driven member, a hydrodynamic brake operative to resist rotation of the first gear unit reaction gear in one direction so as to provide one drive ratio through the first gear unit, the hydrodynamic brake including a stator and a rotor, the rotor having a one-way connection with the reaction gear of the first gear unit, both the stator and the rotor being provided with vanes and coacting to define a fluid working circuit, a vane arranged for movement into and out of the working circuit, biasing means for urging the vane into the working circuit so as to reduce the resistant capacity of the brake and to increase the stall speed thereof, fluid pressure means responsive to the speed of the driven member for urging the vane out of the working circuit, a second gear unit brake operative to prevent rotation of the second gear unit reaction gear in one direction so as to provide one drive ratio through the second gear unit, first and second gear unit clutches fluid operated and so arranged as to condition the respective gear units for another drive ratio, an intermediate clutch fluid operated so as to interconnect the first gear unit output carrier and the second gear unit input gear, a source of fluid pressure, a series of shift valves for operating the clutches and brakes so as to produce ratio changes, one of the shift valves being movable to an upshifted position for producing a ratio change thereby causing fluid pressure to be supplied by the source to operate the first gear unit clutch and the hydrodynamic brake to be relieved of fluid pressure, an intermediate clutch control valve and a second gear unit clutch control valve both rendered effective, when said one shift valve is in the upshifted position, by fluid pressure delivered to the first gear unit clutch to cause, respectively, the intermediate clutch to be relieved of fluid pressure and become inoperative and the second gear unit clutch to be supplied fluid pressure so as to become operative thereby preparing in advance the planetary gearing for another ratio change, and accumulator means coacting with the intermediate clutch control valve and the second gear unit clutch control valve so as to cause the intermediate clutch to become inoperative before the second gear unit clutch becomes operative, another one of the shift valves being movable to an upshifted position so as to cause fluid pressure to again be delivered to operate the hydrodynamic brake thereby completing said another ratio change.

37. In a transmission for a throttle controlled engine, the combination of a driving member joined to the engine, a driven member, planetary gearing interposed between the driving and driven members for providing a plurality of drive ratios therebetween, the planetary gearing comprising first and second gear units, the first gear unit having an input ring gear rotatable by the driving member, a reaction sun gear, and an output planet carrier with a plurality of planet pinions journaled thereon and arranged so as to intermesh with the input ring and reaction sun gears, the second gear unit having an input sun gear, a reaction ring gear, and an output planet carrier rotatable with the driven member and provided with a plurality of planet pinions journaled thereon so as to intermesh with the input sun gear and the reaction ring gear, a hydrodynamic brake operative to resist rotation of the first gear unit reaction sun gear in one direction and to provide one drive ratio through the first gear unit, the hydrodynamic brake including a stator and a rotor, the rotor having a one-way connection with the reaction sun gear of the first gear unit, both the stator and the rotor being provided with vanes and coacting to define a fluid working circuit, a vane arranged for movement into and out of the working circuit, biasing means for urging the vane into the working circuit so as to reduce the resistant capacity of the brake and to increase the stall speed thereof, a source of fluid pressure, fluid pressure means responsive to the speed of the driven member for urging the vane out of the working circuit, a source of fluid pressure, a hydrodynamic brake supply control valve for controlling, in accordance with throttle position, the rate at which the hydrodynamic brake is supplied fluid pressure from the source, a second gear unit brake operative to prevent rotation of the second gear unit reaction ring gear in one direction so as to provide one drive ratio through the second gear unit, first and second gear unit clutches fluid operated and so arranged as to condition the respective gear units for another drive ratio, an intermediate clutch fluid operated so as to interconnect the first gear unit output carrier and the second gear unit input sun gear, a series of shift valves for operating the clutches and brakes so as to produce ratio changes, one of the shift valves being movable to an upshifted position for producing one ratio change thereby causing fluid pressure to be supplied by the source to operate the first gear unit clutch and the hydrodynamic brake to be relieved of fluid pressure, an intermediate clutch control valve and a second gear unit clutch control valve both rendered effective, when said one shift valve is in the upshifted position, by fluid pressure delivered to the first gear unit clutch to cause, respectively, the intermediate clutch to be relieved of fluid pressure and become inoperative and the second gear unit clutch to be supplied fluid pressure so as to become operative thereby preparing in advance the planetary gearing for another ratio change, and accumulator means coacting with the intermediate clutch control valve and second gear unit clutch control valve so as to cause the intermediate clutch to become inoperative before the second gear unit clutch becomes operative, another one of the shift valves being movable to an upshifted position so as to cause fluid pressure to again be delivered to operate the hydrodynamic brake thereby completing said another ratio change.

References Cited in the file of this patent

UNITED STATES PATENTS

| | | |
|---|---|---|
| 874,580 | Farkas et al. | Dec. 24, 1907 |
| 1,997,575 | Cummins | Apr. 16, 1935 |
| 2,241,680 | Taylor | May 13, 1941 |
| 2,279,019 | Black | Apr. 7, 1942 |
| 2,332,588 | Moffitt | Oct. 26, 1943 |
| 2,341,512 | Burtnett | Feb. 15, 1944 |

(Other references on following page)

UNITED STATES PATENTS

| | | |
|---|---|---|
| 2,829,542 | Swennes | Apr. 8, 1958 |
| 2,845,817 | Polomski | Aug. 5, 1958 |
| 2,854,862 | Foerster | Oct. 7, 1958 |
| 2,873,618 | De Lorean | Feb. 17, 1959 |
| 2,875,643 | Kelley | Mar. 3, 1959 |
| 2,919,597 | Borman | Jan. 5, 1960 |
| 2,919,603 | Livermore | Jan. 5, 1960 |

OTHER REFERENCES

Product Engineering Mid-October 1957, page E13.